(12) United States Patent
Ishii et al.

(10) Patent No.: US 7,646,527 B2
(45) Date of Patent: Jan. 12, 2010

(54) INTENSITY DISTRIBUTION OF INCIDENT LIGHT FLUX

(75) Inventors: Fusao Ishii, Menlo Park, CA (US);
Yoshihiro Maeda, Hachioji (JP);
Hirotoshi Ichikawa, Hchioji (JP);
Kazuma Arai, Hachioji (JP)

(73) Assignees: Silicon Quest Kabushiki-Kaisha (JP);
Olympus Corporation (JP)

( * ) Notice: Subject to any disclaimer, the term of this patent is extended or adjusted under 35 U.S.C. 154(b) by 80 days.

(21) Appl. No.: 11/728,553

(22) Filed: Mar. 18, 2007

(65) Prior Publication Data
US 2007/0171507 A1 Jul. 26, 2007

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(51) Int. Cl.
G02B 26/00 (2006.01)

(52) U.S. Cl. .................................... 359/290; 359/291

(58) Field of Classification Search ................. 359/391, 359/395, 390, 291, 290
See application file for complete search history.

(56) References Cited

U.S. PATENT DOCUMENTS

| 5,589,852 | A | 12/1996 | Thompson et al. |
| 6,232,963 | B1 | 5/2001 | Tew et al. |
| 6,592,227 | B2 | 7/2003 | Ouchi et al. |
| 6,648,476 | B2 | 11/2003 | Watanabe et al. |
| 6,819,064 | B2 | 11/2004 | Nakanishi |
| 7,405,856 | B2 * | 7/2008 | Doherty et al. ............. 359/245 |

* cited by examiner

*Primary Examiner*—Jordan M. Schwartz
*Assistant Examiner*—James C Jones
(74) *Attorney, Agent, or Firm*—Bo-In Lin

(57) ABSTRACT

Additional control flexibilities to generate more gray scales for an image display system is achieved by controlling the intensity distribution of the light projection from a light source to a deflecting mirror to further coordinate with the control of the intermediate states of the deflecting mirror. The control light source intensity distribution can provide incident light with wide varieties of intensity distributions including non-uniform, symmetrical and non-symmetrical, different distributions of polarizations, various cross sectional shapes of the incident lights and other combinations of all of the above variations. More stable and better control of gray scale control is also achieved by optimizing the intensity distributions of the incident light to produce the best visual effects of the image display.

50 Claims, 17 Drawing Sheets

INTENSITY DISTRIBUTION OF INCIDENT LIGHT FLUX

This application is a Continuation in Part (CIP) Application of U.S. patent application Ser. Nos. 11/121,543 filed on May 4, 2005 now U.S. Pat. No. 7,268,932. The application Ser. No. 11/121,543 is a Continuation in part (CIP) Application of three previously filed Applications. These Three Applications are 10/698,620 filed on Nov. 1, 2003 now abandonded, 10/699,140 filed on Nov. 1, 2003 now U.S. Pat. No. 6,862,127, and Ser. No. 10/699,143 filed on Nov. 1, 2003 now U.S. Pat. No. 6,903,860 by the Applicant of this Patent Applications. The disclosures made in these Patent Applications are hereby incorporated by reference in this Patent Application.

TECHNICAL FIELD

This invention relates to image display system. More particularly, this invention relates to display system with light source for projecting controllable intensity distribution of incident light flux for controlling gray scales of image display.

BACKGROUND OF THE INVENTION

Even though there are significant advances made in recent years on the technologies of implementing electromechanical micromirror devices as spatial light modulator, there are still limitations and difficulties when employed to provide high quality images display. Specifically, when the display images are digitally controlled, the image qualities are adversely affected due to the fact that the image is not displayed with sufficient number of gray scales.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. Referring to FIG. 1A for a digital video system 1 disclosed in a relevant U.S. Pat. No. 5,214,420 that includes a display screen 2. A light source 10 is used to generate light energy for ultimate illumination of display screen 2. Light 9 generated is further concentrated and directed toward lens 12 by mirror 11. Lens 12, 13 and 14 form a beam columnator to operative to columnate light 9 into a column of light 8. A spatial light modulator 15 is controlled by a computer 19 through data transmitted over data cable 18 to selectively redirect a portion of the light from path 7 toward lens 5 to display on screen 2. The SLM 15 has a surface 16 that includes an array of switchable reflective elements, e.g., micromirror devices 32, such as elements 17, 27, 37, and 47 as reflective elements attached to a hinge 30 that shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of micromirror control scheme as that implemented in the U.S. Pat. No. 5,214,420 and by most of the conventional display system imposes a limitation on the quality of the display. Specifically, when applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than LSB. The least brightness, which determines gray scale, is the light reflected during the least pulse width. The limited gray scales lead to degradations of image display.

Specifically, in FIG. 1C an exemplary circuit diagram of a prior art control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states. state 1 is Node A high and Node B low and state 2 is Node A low and Node B high.

The dual states switching as illustrated by the control circuit controls the micromirrors to position either at an ON of an OFF angular orientation as that shown in FIG. 1A. The brightness, i.e., the gray scales of display for a digitally control image system is determined by the length of time the micromirror stays at an ON position. The length of time a micromirror is controlled at an ON position is in turned controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each of the four bits where 1 is for the least significant bit and 8 is for the most significant bit. According to the control mechanism as shown, the minimum controllable differences between gray scales for showing different brightness is a brightness represented by a "least significant bit" that maintaining the micromirror at an ON position.

When adjacent image pixels are shown with great degree of different gray scales due to a very coarse scale of controllable gray scale, artifacts are shown between these adjacent image pixels. That leads to image degradations. The image degradations are specially pronounced in bright areas of display when there are "bigger gaps" of gray scales between adjacent image pixels. It was observed in an image of a female model that there were artifacts shown on the forehead, the sides of the nose and the upper arm. The artifacts are generated due to a technical limitation that the digital controlled display does not provide sufficient gray scales. At the bright spots of display, e.g., the forehead, the sides of the nose and the upper arm, the adjacent pixels are displayed with visible gaps of light intensities.

As the micromirrors are controlled to have a fully on and fully off position, the light intensity is determined by the length of time the micromirror is at the fully on position. In order to increase the number of gray scales of display, the speed of the micromirror must be increased such that the digital control signals can be increased to a higher number of bits. However, when the speed of the micromirrors is increased, a strong hinge is necessary for the micromirror to sustain a required number of operational cycles for a designated lifetime of operation, In order to drive the micromirrors supported on a further strengthened hinge, a higher voltage is required. The higher voltage may exceed twenty volts and may even be as high as thirty volts. The micromirrors manufacture by applying the CMOS technologies probably would not be suitable for operation at such higher range of voltages and therefore the DMOS micromirror devices may be required. In order to achieve higher degree of gray scale control, a more complicate manufacturing process and larger device areas are necessary when DMOS micromirror is implemented. Conventional modes of micromirror control are therefore facing a technical challenge that the gray scale accuracy has to be sacrificed for the benefits of smaller and more cost effective micromirror display due to the operational voltage limitations.

There are many patents related to light intensity control. These Patents include U.S. Pat. Nos. 5,589,852, 6,232,963, 6,592,227, 6,648,476, and 6,819,064. There are further patents and patent applications related to different shapes of light sources. These Patents includes U.S. Pat. Nos. 5,442,414, 6,036,318 and Application 20030147052. The U.S. Pat. No. 6,746,123 discloses special polarized light sources for preventing light loss. However, these patents and patent application do not provide an effective solution to overcome the limitations caused by insufficient gray scales in the digitally controlled image display systems.

Furthermore, there are many patents related to spatial light modulation that includes U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed and provided direct resolutions for a person of ordinary skill in the art to overcome the above-discussed limitations and difficulties.

Therefore, a need still exists in the art of image display systems applying digital control of a micromirror array as a spatial light modulator to provide new and improved systems such that the above-discussed difficulties can be resolved.

SUMMARY OF THE INVENTION

The present invention relates to control of a light source to project an incident light with a predefined distribution of light intensity in the incident light flux. The purpose of controlling the intensity distribution of the incident light is to apply such distribution in coordination with the spatial light modulators (SLMs) that has intermediate state control for providing more flexibly controllable gray scales of display. The control and generation of display of additional gray scales are achieved without requiring a higher speed of micromirror oscillation thus maintaining a low operational voltage.

In another aspect, the present invention provides a projection device with new and improved display with increased gray scale by controlling the input light source to provide controllable intensity distribution or controllable variation of projection shapes of the incident light flux. The non-uniformity or the unsymmetrical light intensity and shapes of the incident light cross sections are on the pupil of the incident light optics and not on a face of the SLM. If the incident light is not uniform on a SLM, the projected image on a screen is not an uniform image.

In yet another aspect, the present invention provides a projection device by projecting a non-uniform incident light or variety of shapes of incident light cross section at the pupil along an optical path. By controlling the intensity distribution or the cross section shapes of the incident light, the gray scale for display is now controllable to project finer scale of brightness differences between adjacent pixels with an additional controllable state to provide a fraction of brightness of the fully-on state for display. The annoying artifacts shown on a display caused by adjacent pixels having huge gray scale gaps can be significantly reduced.

In yet another aspect, the present invention provides a method of controlling the shapes and the intensity distribution of the incident light by providing a specially configured light source. Furthermore, the method includes a step of coordinating the shapes and intensity distribution of the incident light with an array of micromirror devices. Optionally, the micromirrors are enabled to oscillate in a reverse direction or stop before the micromirror completes a full oscillation cycle. Aided by such control flexibility and the fractional brightness for image display during an intermediate oscillation state, additional flexibilities are now provided to fine tune the gray scale for each image pixel especially for the high brightness display area where a gray scale difference are proportionally amplified due to the high intensity of light projections.

These and other objects and advantages of the present invention will no doubt become obvious to those of ordinary skill in the art after having read the following detailed description of the preferred embodiment, which is illustrated in the various drawing figures.

BRIEF DESCRIPTION OF FIGURES

The present invention is described in detail below with reference to the following Figures.

DESCRIPTION OF PREFERRED EMBODIMENTS

Figure 1A:
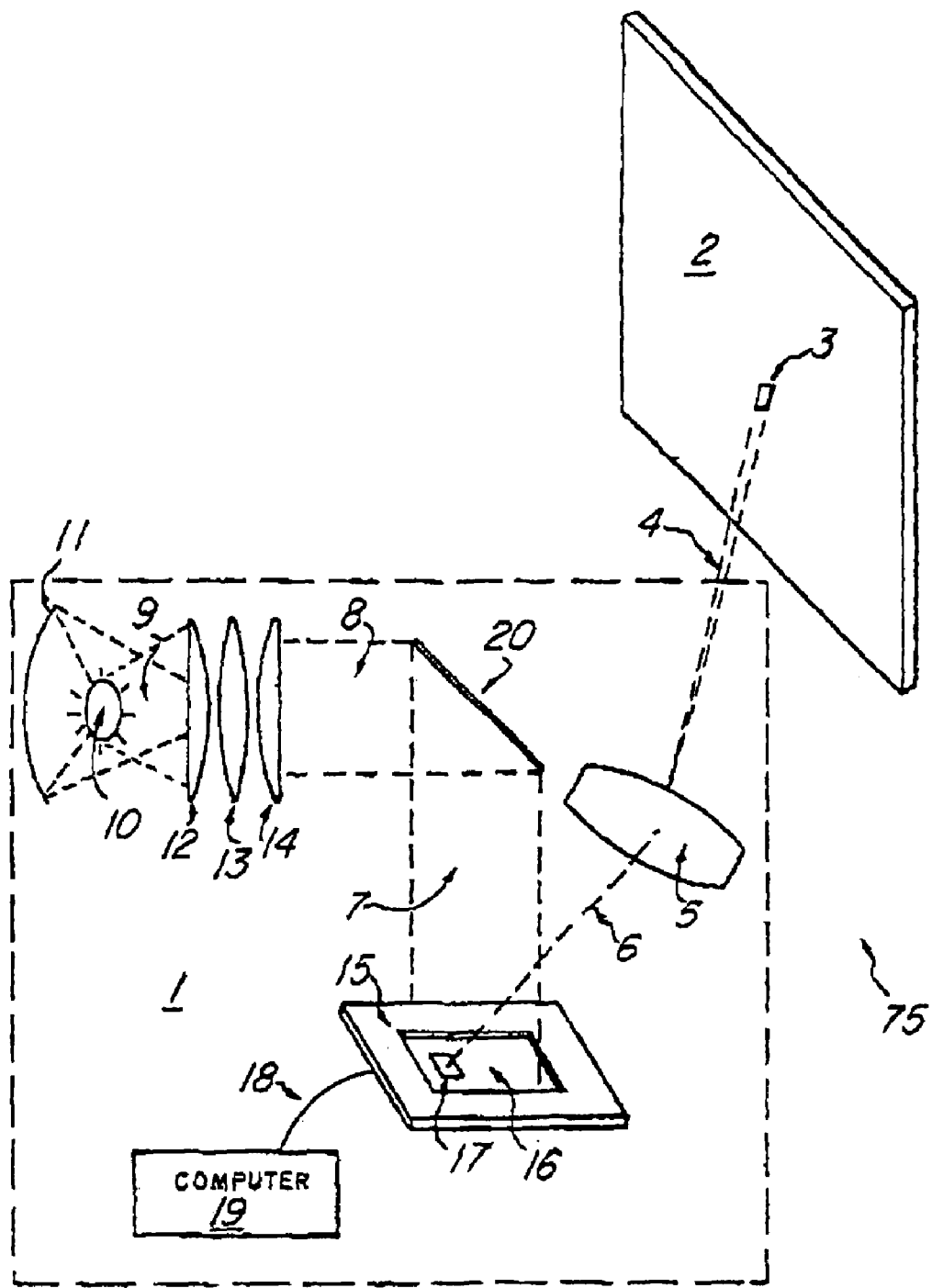
FIGS. 1A and 1B are functional block diagram and a top view of a portion of a micromirror array implemented as a spatial light modulator for a digital video display system of a conventional display system disclosed in a prior art patent.
Figure 1B:
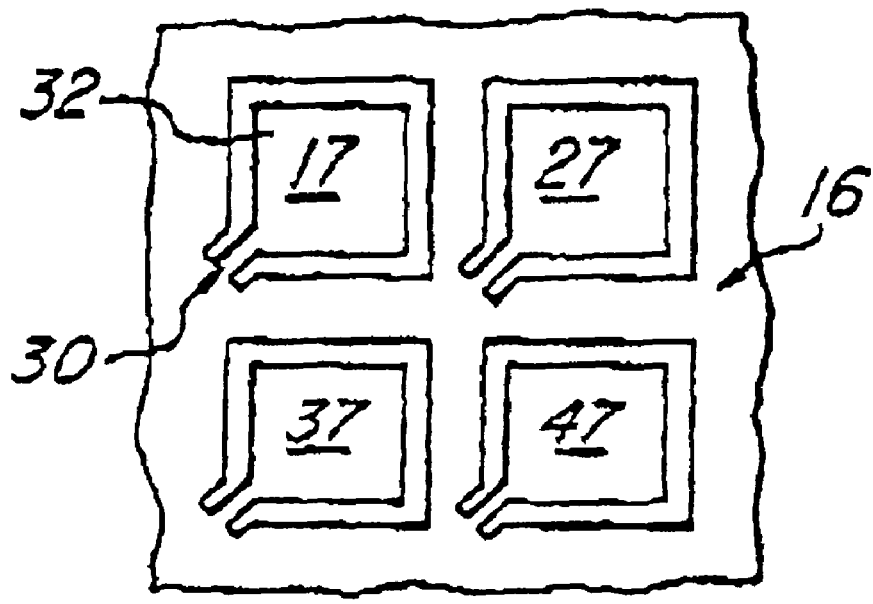
Figure 1C:
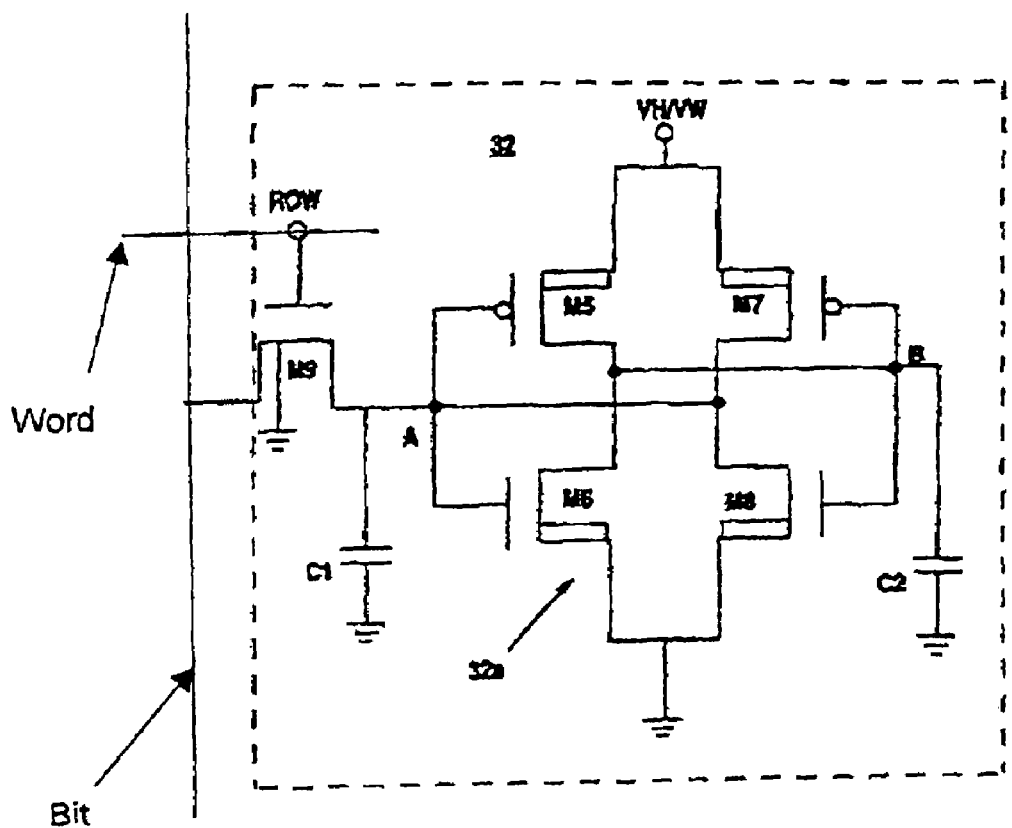
FIG. 1C is a circuit diagram for showing a prior art circuit for controlling a micromirror to position at an ON and OFF states of a spatial light modulator.
Figure 1D:
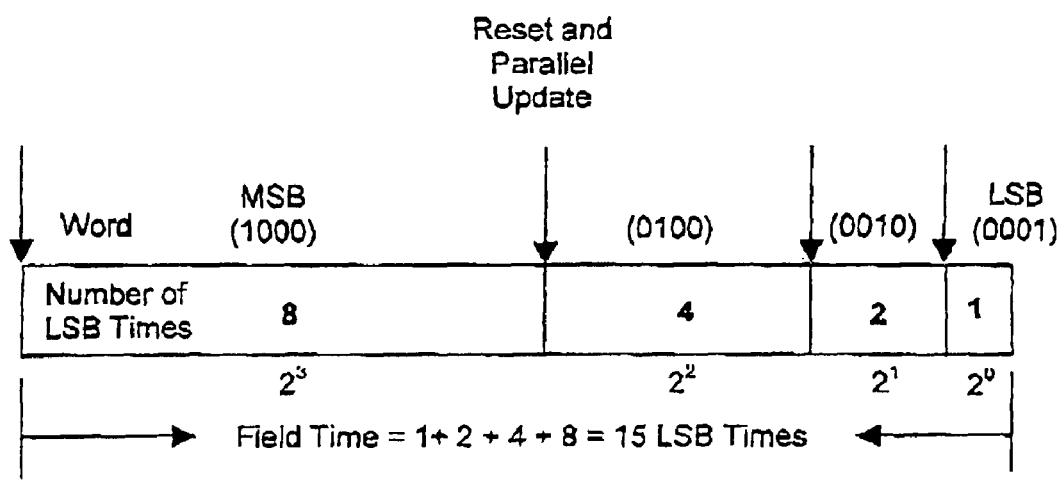
FIG. 1D is diagram for showing the binary time intervals for a four bit gray scale.
Figure 2:
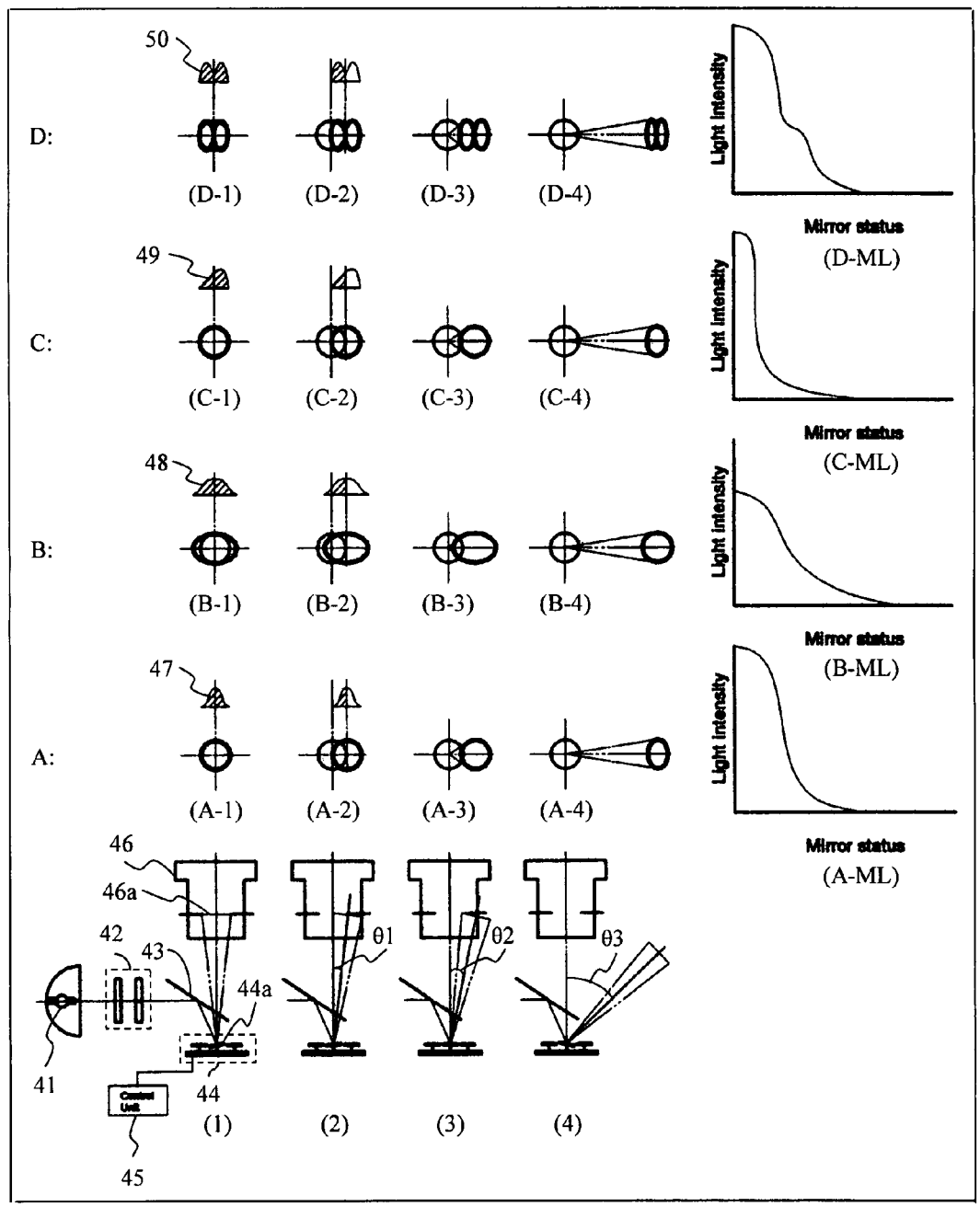
FIG. 2 includes diagrams for showing different shapes and intensity distributions of incident light that coordinate with the deflecting mirror of a SLM to generate image light intensity distributions when the deflecting mirror is moved to different angular positions.
Figure 3:
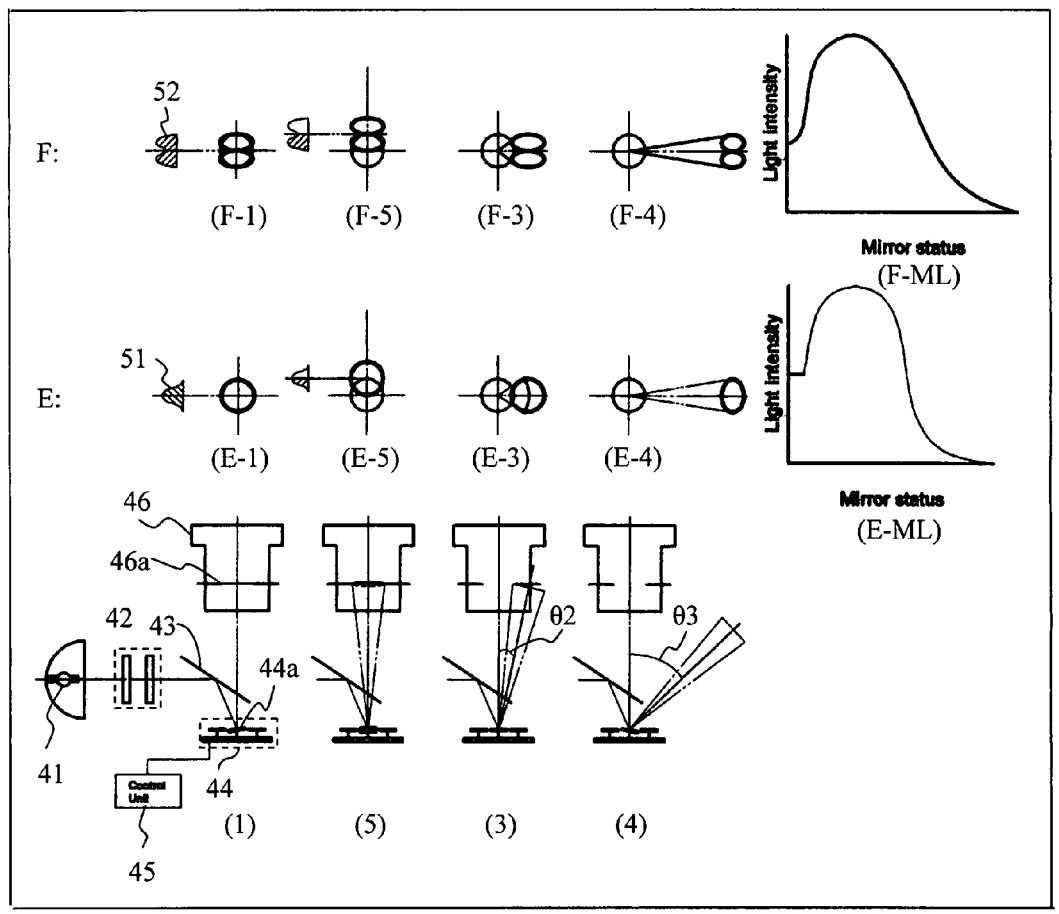
FIG. 3 includes additional diagrams for showing different shapes and intensity distributions of incident light that coordinate with the deflecting mirror of a SLM to generate image light intensity distributions when the deflecting mirror is moved to different angular positions.

Referring to FIGS. 2 and 3 for illustrating the operation principles according to a first embodiment of this invention. The first embodiment is a projection device using a deflecting type of spatial light modulator placed in the light path from an illumination and the light path has a non-uniform light distribution at pupil, iris or stop to achieve the optimization of gray-scale so that the incident light variance is optimum to realize a gray-scale improvement.

In FIGS. 2 and 3, display system (1) schematically shows the configuration of the projection device according to this embodiment. This projection device comprises a light source 41, illumination optics means 42, such as a condenser lens, etc., for collecting and directing light from the light source 41, a mirror 43 for reflecting the light from the illumination optics means 42 to a deflecting type spatial light modulator (hereinafter referred to simply as "SLM"), a control unit 45 for controlling the deflection angle holding operation and the oscillation operation of each deflecting mirror (44a, etc.) of the SLM 44 based on an input signal so that a desired light amount is directed toward a pupil 46a of a projection optics 46, the SLM 44 for performing the deflection angle holding operation or the oscillation operation of each deflecting mirror under the control of the control unit 45, and for reflecting light (illumination light) incident to each deflecting mirror, the projection optics 46 for projecting the light reflected from the SLM 44, and the like. The deflecting mirror is referred to also as a mirror element.

Additionally, as will be described in detail later, in this projection device, the light source 41 and/or the illumination optics means 42 are configured so that the intensity distribution or the average light amount of illumination light becomes non-uniform within a range of an incident NA (Numerical Aperture) to each deflecting mirror (44a, etc.) of the SLM 44, and/or the cross section of illumination light flux takes a shape other than the shape of the cross section of a solid circle centering on the optical axis of the illumination light, within that range.

Furthermore, display system (1) shows the light source 41 projects a light to the mirror 43 for reflecting the light to the SLM 44 controlled by the control unit 45 to deflect the incident light to the iris 46a of the projection optics 46.

In FIGS. 2 and 3, display configurations (2) to (5) schematically show a partial configuration of the projection device according to this embodiment. However, the mirror status representing the angular positions of a deflecting mirror, e.g., 44a in (2) to (5) differs from that in projection configuration (1).

For more details, the mirror status in (1) of FIGS. 2 and 3 represents the status of the deflecting mirror 44a when the optical axis of light reflected on the deflecting mirror 44a matches that of the projection optics 46.

The mirror status in (2) of FIG. 2 represents the status of the deflecting mirror 44a when the optical axis of light reflected on the deflecting mirror 44a inclines by an angle $\theta_1$ from the optical axis of the projection optics 46 toward the right side of FIG. 2 in parallel to the paper plane of this figure.

The mirror status in (3) of FIGS. 2 and 3 represents the status of the deflecting mirror 44a when the optical axis of light reflected on the deflecting mirror 44a inclines by an angle $\theta_2$ ($\theta_1 < \theta_2$) from the optical axis of the projection optics 46 toward the right side of FIGS. 2 and 3 in parallel to the paper planes of the figures.

The mirror status in (4) of FIGS. 2 and 3 represents the status of the deflecting mirror 44a when the optical axis of light reflected on the deflecting mirror 44a inclines by an angle $\theta_3$ ($\theta_2 < \theta_3$) from the optical axis of the projection optics 46 toward the right side of FIGS. 2 and 3 in parallel to the paper planes of the figures.

The mirror status in (5) of FIG. 3 represents the status of the deflecting mirror 44a when the optical axis of light reflected on the deflecting mirror 44a inclines by an angle $\theta_1$ from the optical axis of the projection optics 46 toward the depth side of FIG. 3 vertically to the paper plane of this figure.

Namely, (2), (3), (4), and (5) show the deflected light from the SLM 44 as the deflecting mirror 44a of the SLM 44 are moving to different deflecting angles.

Additionally, (1) represents a fully ON position where the entire incident light is projected onto the iris 46a of the projection optics 46 for image display while (2), (3), and (5) represent intermediate states and (4) represents a fully OFF position.

Referring to (A-1) to (A-4) shown in FIG. 2 for the light intensity distribution at the iris 46a where the incident light has a circular shape as that shown in (A-1) when the deflecting mirror 44a of the SLM 44 is at an fully ON position. The shapes of the projection light at the iris 46a gradually change as the deflecting mirror 44a of the SLM 44 oscillates to different angular positions as shown in (A-2), (A-3), and (A-4) while the light intensity variations are shown in (A-ML) in FIG. 2 as the deflecting mirror 44a of the SLM 44 moves to different position according to that shown in (A-1) to (A-4) from a fully ON position to a fully OFF position.

(A-1) to (A-4) represent a reflection light flux from the deflecting mirror 44a, and the pupil 46a in the mirror statuses respectively in (1) to (4), and represent the cross section of the reflection light flux with a thick line. Besides, (A-1) and (A-2) also represent the intensity distribution of light on the cross section of the reflection light flux, and shade a range included in the pupil 46a. The examples shown in (A-1) to (A-4) are those implemented when light such that the cross section of the reflection light flux matches the pupil 46a in the position of the pupil 46a in the mirror status of (1), and a distribution 47, which is a normal distribution as the intensity distribution of light in that position, is obtained as shown in (A-1) is incident to the deflecting mirror 44a. Here, the intensity distribution 47 is also a distribution that is non-uniform in a direction nearly parallel to the moving direction of the optical axis of the reflection light, which varies with a change in the mirror status. (A-ML) represents the light intensity in the pupil 46a when the mirror status is changed from (1) to (4).

Referring to (B-1) to (B-4) shown in FIG. 2 for an incident light of a non-circular oval shape. (B-ML) shown in FIG. 2 clearly shows that the light intensity now has a different distribution than that shown in (A-ML). Therefore, by changing the shape of the incident light, light intensity distribution as the deflecting mirror 44a is moved to different angular positions can be adjusted.

Similarly, (B-1) to (B4) represent a reflection light flux from the deflecting mirror 44a, and the pupil 46a in the mirror statuses respectively in (1) to (4), and represent the cross section of the reflection light flux with a thick line. Besides, (B-1) and (B-2) also represent the intensity distribution of light on the cross section of the reflection light flux, and shade a range included in the pupil 46a. The examples shown in (B-1) to (B4) are those implemented when light such that the cross section of the reflection light flux has an elliptical shape including the pupil 46a in the position of the pupil 46a in the mirror status of (1), its longer axis direction is in parallel to the moving direction of the optical axis of the reflection light, which varies with a change in the mirror status, and a distribution 48, which is a normal distribution as the intensity distribution of light in the position of the pupil 46a, is obtained as shown in (B-1) is incident to the deflecting mirror 44a. Here, the intensity distribution 48 is also a distribution that is non-uniform in a direction nearly parallel to the moving direction of the optical axis of the reflection light, which varies with a change in the mirror status. (B-ML) represents the light intensity within the pupil 46a when the mirror status is changed from (1) to (4) in this example. As indicated by (B-ML), the inclination of light intensity, which varies with a change in the mirror status, can be made gentle, and the range of the deflection angle of the deflecting mirror, in which micro output light can be obtained, can be widened. As a result, the degree of change in the light intensity when the deflection angle of the mirror fluctuates, for example, due to variations in the manufacturing of a component (such as a hinge, etc.) that configures the deflecting mirror can be reduced. Accordingly, precision required for the deflecting mirror control can be reduced.

Similarly, in (C-1) to (C-4) shown in FIG. 2, the incident light intensity has a non-symmetrical distribution and the projection light intensity as shown in (C-ML) in FIG. 2 has different variations when the deflecting mirror 44a is moved through the intermediate states between the fully ON and fully OFF position. This incident light intensity distribution allows additional oscillation control period because of the lower image light intensity in the intermediate states. The incident light intensity distribution thus enables additional intermediate state gray scales control flexibility for greater number of gray scales.

In a similar manner, (C-1) to (C-4) represent a reflection light flux from the deflecting mirror 44a, and the pupil 46a in the mirror statuses respectively in (1) to (4), and represent the cross section of the reflection light flux with a thick line. Besides, (C-1) and (C-2) also represent the intensity distribution of light on the cross section of the reflection light flux, and shade a range included in the pupil 46a. The examples shown in (C-1) to (C-4) are those implemented when light such that the cross section of the reflection light flux matches the pupil 46a in the position of the pupil 46a in the mirror status of (1), and a distribution 49, which inclines toward the optical axis direction of the reflection light in the mirror status of (4), is obtained as the intensity distribution of light in that position as shown in (C-1) is incident to the deflecting mirror 44a. Here, the intensity distribution 49 is also a distribution that is non-uniform in a direction nearly parallel to the moving direction of the optical axis of the reflection light, which varies with a change in the mirror status. (C-ML) represents the light intensity in the pupil 46a when the mirror status is changed from (1) to (4). As described above, the intensity distribution of light is inclined like the distribution 49, whereby an intermediate light amount can be obtained only by slightly inclining the deflecting mirror 44a from the mirror status of (1) toward the mirror status of (4). Besides, a high intensity point of the intensity distribution of light further moves away from the pupil 46a as shown in (C-4) in the mirror status of (4), thereby enabling the contrast at the time of the fully OFF position to be improved.

(D-1) to (D-4) shown in FIG. 2 shows the incident light has an intensity distribution of an irregular double-eye shape and the light intensity variations as shown in (D-ML) in FIG. 2 has a different variation as the deflecting mirror 44a of the SLM 44 is oscillating from the fully ON to the fully OFF position.

Similarly, (D-1) to (D-4) represent a reflection light flux from the deflecting mirror 44a, and the pupil 46a in the mirror statuses respectively in (1) to (4), and represent the cross section of the reflection light flux with a thick line. Besides, (D-1) and (D-2) also represent the intensity distribution of light on the cross section of the reflection light flux, and shade a range included in the pupil 46a. The examples shown in (D-1) to (D-4) are those implemented when light such that the cross section of the reflection light flux takes a shape where two ellipses are arranged in series in the moving direction of the optical axis of the reflection light, which varies with a change in the mirror status, in the position of the pupil 46a in the mirror status of (1), and a distribution 50 where high intensity mountains are arranged in series in the moving direction of the optical axis of the reflection light, which varies with a change in the mirror status, is obtained as the intensity distribution of light in the position of the pupil 46a in accordance with the shape of the cross section of the reflection light flux as shown in (D-1) is incident to the deflecting mirror 44a. Here, the longer axis direction of the cross section of the reflection light flux is vertical to the moving direction of the optical axis of the reflection light, which varies with a change in the mirror status. Additionally, the intensity distribution 50 is also a distribution that is non-uniform in the direction nearly parallel to the moving direction of the optical axis of the reflection light, which varies with a change in the mirror status. (D-ML) represents the light intensity in the pupil 46a when the mirror status is changed from (1) to (4) in this example. The intensity distribution of light is implemented as the distribution 50 as described above, whereby an inflection point is provided in the change of the light intensity, and the change of the light intensity becomes gentle in the vicinity of the inflection point. As a result, a stable intermediate light amount can be obtained.

From these examples, it is clearly illustrated that by controlling the intensity distribution of the incident light, additional control can be achieved for varying the image display intensity to generate additional gray scales. As illustrated in each example, the control unit 45 enables multiple state control of defecting states of illumination light by the SLM 44 and the examples realize greater number of gray scales projection by leading desired light intensity into optical path utilizing the change of the incident light to optical path in deflection process optimized as described previously. Please also note that the intensity distribution is shifted toward OFF position so that less movement of the deflecting mirror 44a of the SLM 44 is required to achieve intermediate intensity. The peak of the light distribution is further from the iris 46a position and this will improve the contrast at OFF position. The peak of intensity is shifted toward deflecting direction of the light axis. This will cause the change of curvature and this change enables easier intermediate state creation.

Referring to (1), (5), (3), (4) shown in FIG. 3 for the projection of incident light for the projection device where the incident light has shapes and intensity distributions shown in (E-1) and (F-1) in FIG. 3 when the deflecting mirror 44a of the SLM 44 is at the fully ON position. (E-ML) and (F-ML) shown in FIG. 3 shows the display light intensity as the deflecting mirror 44*a* is moved from the fully ON position to the fully OFF position. Again, by adjusting and controlling the shapes and the intensity distribution of the incident light at the iris 46*a* of the projection optics 46, the image light intensity as shown in (E-ML) and (F-ML) can be controlled to generate greater number of gray scales. The incident light intensity distribution is implemented with assumption that the deflecting mirror 44*a* of the SLM 44 has an intermediate state located out of the moving plane of the light axis. (F-ML) illustrates that a control flexibility is provided to achieve stable output light.

In FIG. 3, (E-1), (E-5), (E-3), (E-4), and (F-1), (F-5), (F-3), (F-4) respectively represent a reflection light flux from the deflecting mirror 44*a*, and the pupil 46*a* in the mirror statuses of (1), (5), (3), and (4) respectively, and represent the cross section of the reflection light flux with a thick line. Additionally, (E-1), (E-5) and (F-1), (F-5) also represent the intensity distribution of light on the cross section of the reflection light flux, and shade a range included in the pupil 46*a*.

The examples shown in (E-1), (E-5), (E-3), and (E-4) are those implemented when light such that the cross section of the reflection light flux matches the pupil 46*a* in the position of the pupil 46*a* in the mirror status of (1), and a distribution 51, which is a normal distribution as the intensity distribution of light in that position, is obtained as shown in (E-1) is incident to the deflecting mirror 44*a*. Here, the intensity distribution 51 is also a distribution that is non-uniform in a direction nearly vertical to the moving direction of the optical axis of the reflection light, which varies with a change in the mirror status (a change among (1), (3), and (4)). (E-ML) represents the light intensity in the pupil 46*a* when the mirror status is changed to (5), (1), (3), and (4) in this example.

The examples shown in (F-1), (F-5), (F-3), and (F-4) are those implemented when light such that the cross section of the reflection light flux takes a shape where two ellipses are arranged vertically to the moving direction of the optical axis of the reflection light, which varies with a change in the mirror status (a change among (1), (3), and (4)), and a distribution 52 where high intensity mountains are arranged vertically to the moving direction of the optical axis of the reflection light, which varies with a change in the mirror status (a change among (1), (3), and (4)), is obtained as the intensity distribution of light in that position in accordance with the shape of the cross section of the reflection light flux as shown in (F-1) is incident to the deflecting mirror 44*a*. Here, the longer axis direction of the shape of the cross section of the reflection light flux is parallel to the moving direction of the optical axis of the reflection light, which varies with a change in the mirror status (a change among (1), (3), and (4)). Besides, the intensity distribution 52 is also a distribution that is non-uniform in a direction nearly vertical to the moving direction of the optical axis of the reflection light, which varies with a change in the mirror status (a change among (1), (3), and (4)). (F-ML) represents the light intensity in the pupil 46*a* when the mirror status is changed to (5), (1), (3), and (4). According to this example, stable output light can be obtained from the projection optics 46.

The examples shown in FIG. 3 are those implemented when the optical axis of the reflection light in the mirror status for obtaining an intermediate light amount is provided outside the moving plane of the optical axis of the reflection light, which varies with a change in the mirror status shown in the examples of FIG. 2.

Next, a configuration of the light source 41 and/or the illumination optics means 42, which is intended to obtain the above described reflection light such that the intensity distribution of the cross section of light flux is non-uniform in the position of the pupil 46*a* of the projection optics 46, and/or the reflection light such that the cross section of the light flux takes a shape other than the shape of the cross section of a solid circle centering on the optical axis, is described in detail. This configuration is also a configuration for making the intensity distribution or the average light amount of illumination light non-uniform within the range of an incident NA to each deflecting mirror (44*a*, etc.) of the SLM 44, or a configuration for giving the cross section of illumination light flux a shape other than the shape of the cross section of a solid circle centering on the optical axis of the illumination light within that range.

Figure 4:
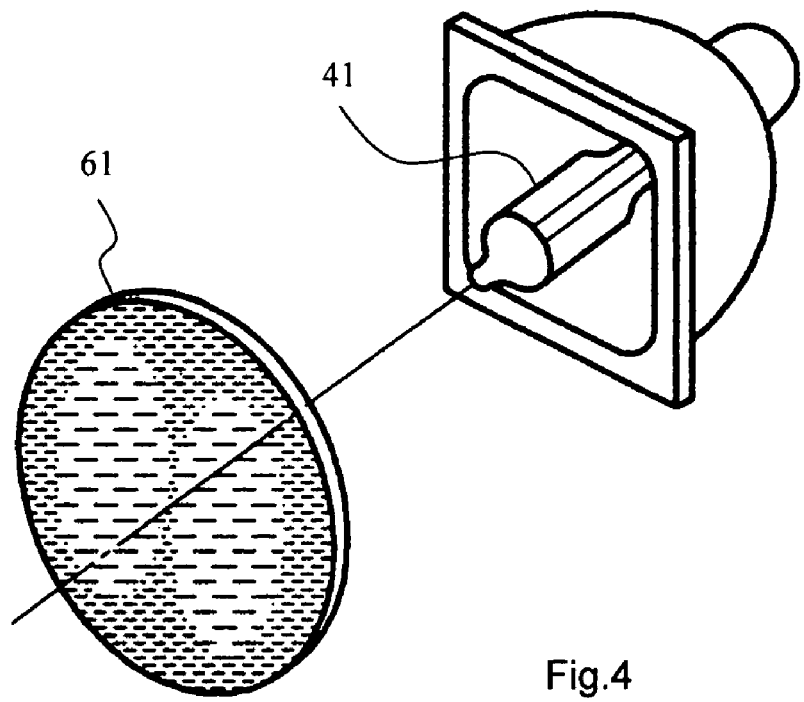
FIG. 4 shows a projecting device where the scattering or the diverging characteristics of the optical device as that located at the image of illumination or around the illumination is non-uniform.

Referring to FIG. 4 for illustrating the projecting device where the scattering or the diverging characteristics of the optical device as that located at the image of illumination or around the illumination is non-uniform. "at the image of illumination" also includes a plane on which a light source image is formed, whereas "around the illumination" also includes the vicinity of the light source 41. FIG. 4 schematically shows the light source 41, and the optical element 61 included in the illumination optics means 42. The optical element 61, which is provided on the plane where the light source image is formed or in the vicinity of the light source 41, is an optical element having a non-uniform diverging or scattering characteristic, and is, for example, a filter partially having a different transmittance, or the like. A non-uniform intensity distribution can be given to the illumination light by the illumination optics means 42 including such an optical element 61.

Figure 5A:
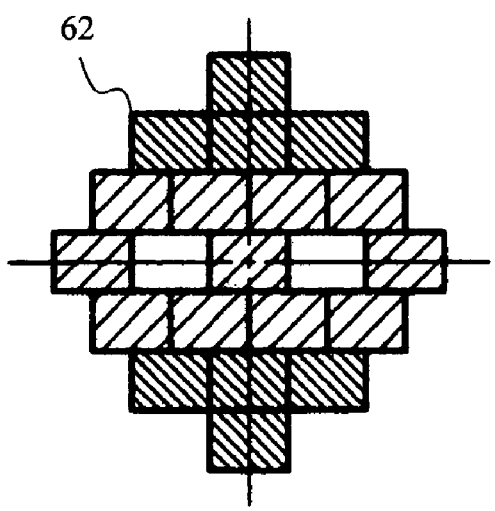
FIGS. 5A and 5B show a projection device where the illumination projection is from a fly-eye lens that include multiple micro-lenses and each micro-lens can be controlled or configured with different optical characteristics.
Figure 5B:
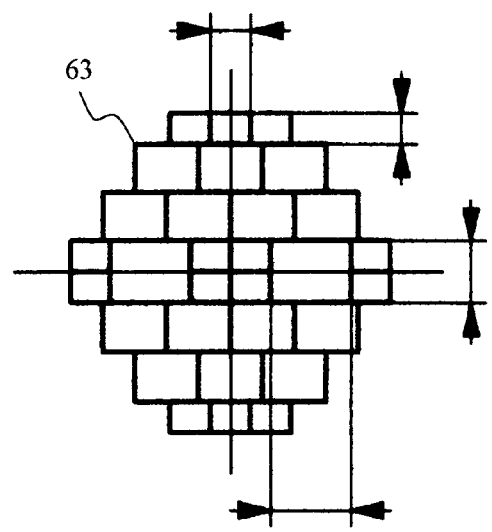

FIGS. 5A and 5B show the projection device where the illumination projection is from a fly-eye lens that include multiple micro-lenses and each micro-lens can be controlled or configured with different optical characteristics, e.g. reflectivity, deflecting angles, or degrees of light transmission, fill factor, etc. FIGS. 5A and 5B schematically show a fly-eye lens that is included in the illumination optics means 42, and composed of a plurality of micro-lenses including micro-lenses having different optical characteristics. FIG. 5A shows a fly-eye lens 62 composed of a plurality of micro-lenses including micro-lenses having a different transmittance, whereas FIG. 5B shows a fly-eye lens 63 composed of a plurality of micro-lenses including micro-lenses having a different aperture ratio. Also with the illumination optics means 42 including such a fly-eye lens, a non-uniform intensity distribution can be given to the illumination light.

Here, specific configuration examples of the illumination optics means 42 are described.

Figure 6A:
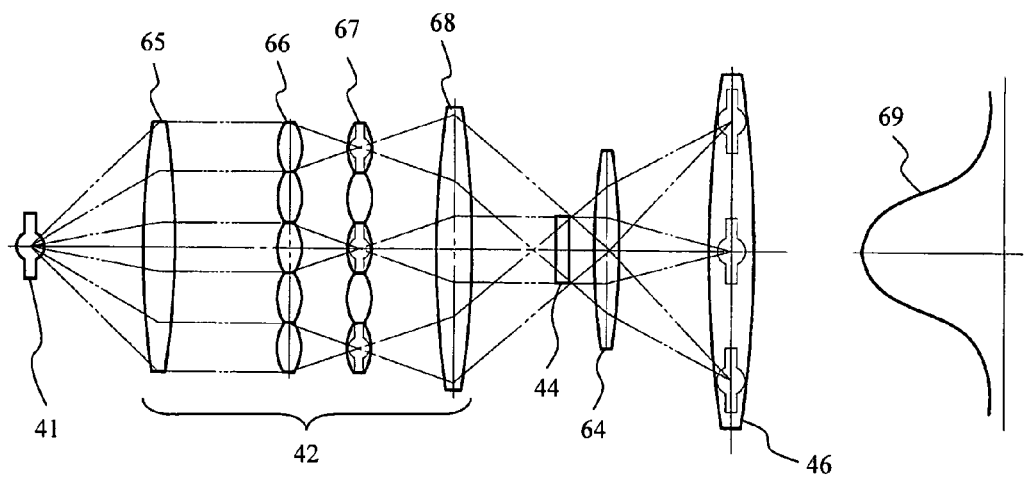
FIGS. 6A, 6B, and 6C explain specific configuration examples of illumination optics means.
Figure 6B:
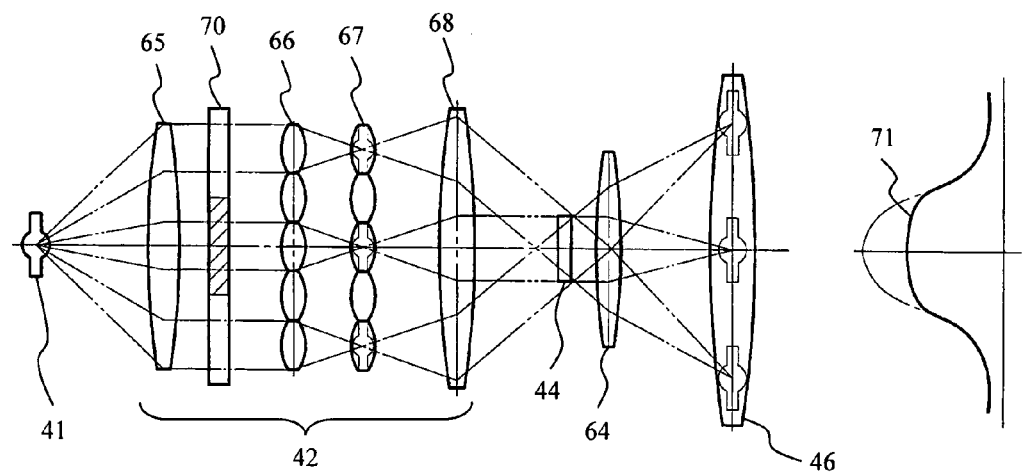
Figure 6C:
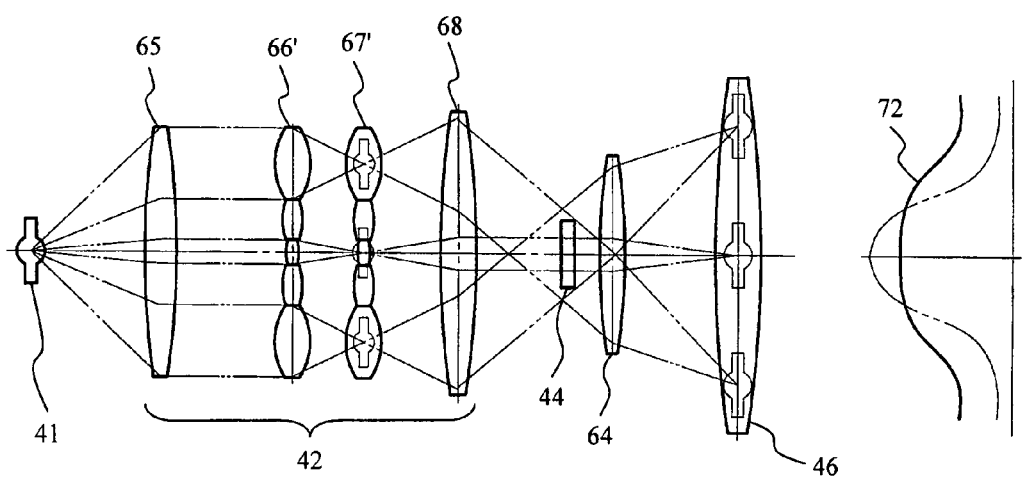

FIGS. 6A, 6B, and 6C schematically show a projection device according to this embodiment. FIGS. 6A to 6C depict that light passes through the SLM 44, for the sake of convenience. Actually, however, light reflects on the SLM 44 as shown in FIGS. 2 and 3. Besides, a condenser lens 64 is provided between the SLM 44 and the projection optics (projection lens) 46. This lens is omitted in FIGS. 2 and 3.

In the configuration example shown in FIG. 6A, the illumination optics means 42 comprises a condenser lens 65, fly-eye lenses 66 and 67, and an illumination lens 68. According to this configuration example, the intensity distribution of the cross section of light flux in the position of the pupil 46*a* of the projection optics 46 in the mirror status of (1) shown in FIGS. 2 and 3 becomes a distribution 69.

In the configuration example shown in FIG. 6B, the illumination optics means 42 comprises a condenser lens 65, a filter 70, fly-eye lenses 66 and 67, and an illumination lens 68. Namely, this is the configuration where the filter 70 is provided between the condenser lens 65 and the fly-eye lens 66, which are shown in FIG. 6A. The filter 70 is a filter the shaded portion of which has a lower transmittance than the other portions. The filter 70 is also one example of the optical element 61 shown in FIG. 4. According to this configuration example, the intensity distribution of the cross section of the light flux in the position of the pupil 46*a* of the projection optics 46 in the mirror status of (1) shown in FIGS. 2 and 3 becomes a distribution 71, and a light amount in the central portion can be reduced in comparison with the distribution 69 shown in FIG. 6A.

In the configuration example shown in FIG. 6C, the illumination optics means 42 comprises a condenser lens 65, fly-eye lenses 66' and 67', and an illumination lens 68. Namely, the illumination optics means 42 comprises the fly-eye lenses 66' and 67' having optical characteristics that are different from the fly-eye lenses 66 and 67 shown in FIG. 6A as their replacement. The optical characteristics of the plurality of micro-lenses that configure the fly-eye lens shown in FIG. 6A are the same, but the plurality of micro-lenses that configure the fly-eye lens shown in FIG. 6C include micro-lenses having a different optical characteristic (the number of apertures in the example of FIG. 6C). The fly-eye lenses 66' and 67' are also one example of the fly-eye lens 63 shown in FIG. 5B. According to this configuration example, the intensity distribution of the cross section of the light flux in the position of the pupil 46*a* of the projection optics 46 in the mirror status of (1) shown in FIGS. 2 and 3 becomes a distribution 72, and its inclination can be made gentle in comparison with the distribution 69 shown in FIG. 6A.

Flexible control of incident light intensity distributions or shapes can be conveniently achieved. For example, the cross section of the light flux is non-symmetrical around the axis of the light path in the part of the light path from the illumination through the SLM 44 or from the SLM 44 through a screen for displaying an image. This can be also said that the cross section of light flux has a shape other than the shape of the cross section of a solid circle centering on the optical axis in at least a portion of the illumination light path extending from the light source 41 to the SLM 44, or the projection light path extending from the SLM 44 to the image display plane not shown. Such the projection device may also be applied to project an incident light where the light intensity distribution is non-uniform and the illumination area is non-uniform for producing best images under different circumstances. An example where the intensity distribution of the cross section of light flux is non-uniform and a radiation field is asymmetric is described, for example, with reference to (D-1) to (D-4) of FIG. 2.

The projection device according to this embodiment can be also configured to change the optical position of the light source 41.

Figure 7A:
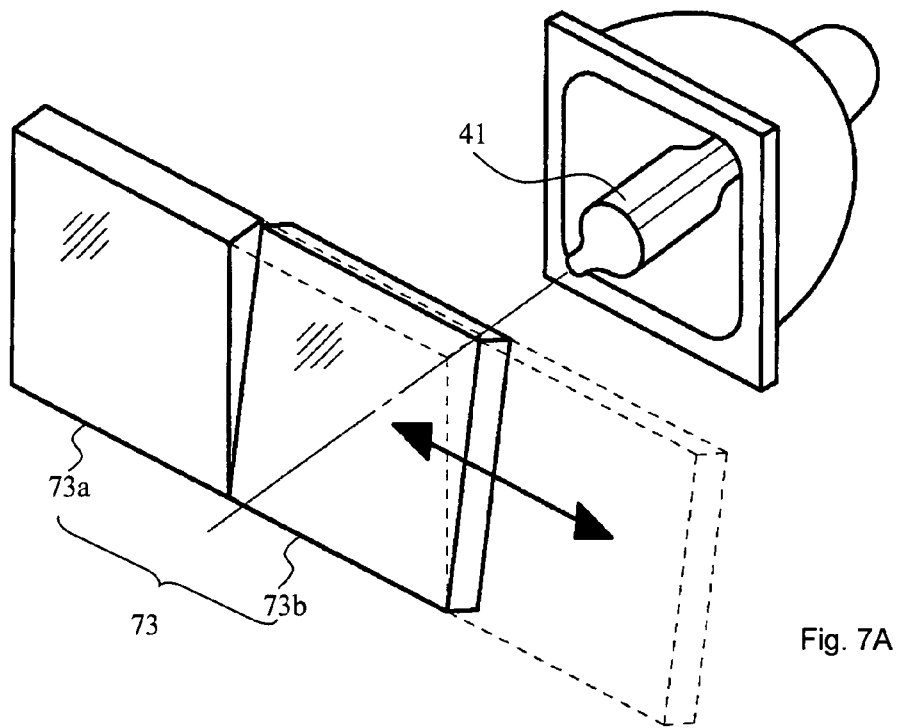
FIGS. 7A, 7B, 7C, 7D, and 7E explain a configuration example for changing the optical position of a light source.

FIGS. 7A, 7B, 7C, and 7E are diagrams explaining a configuration example for changing the optical position of the light source 41. This configuration example is an example where the optical position of the light source 41 is changed by using a parallel flat plate 73 (73*a*, 73*b*) that is insertable/removable in/from the light path as shown in FIG. 7A. The parallel flat plate 73 is configured as one piece by arranging, side by side, a parallel flat plate part 73*a* that is vertical to the light path, and a parallel flat plate part 73*b* that inclines by a predetermined angle from the parallel flat plate part 73*a*.

Figure 7B:
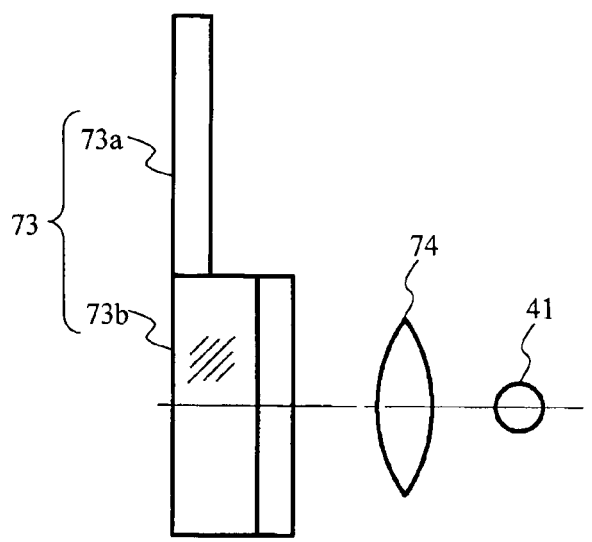
Figure 7C:
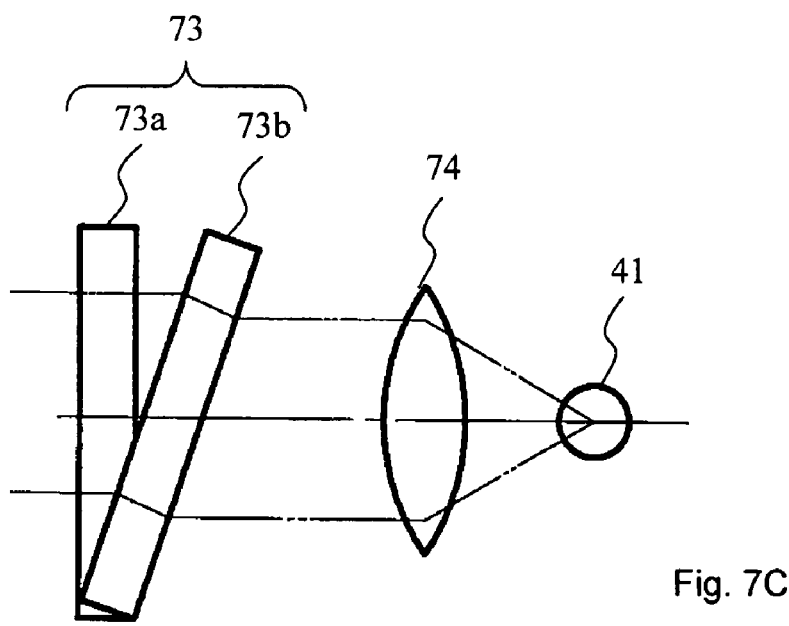
Figure 7D:
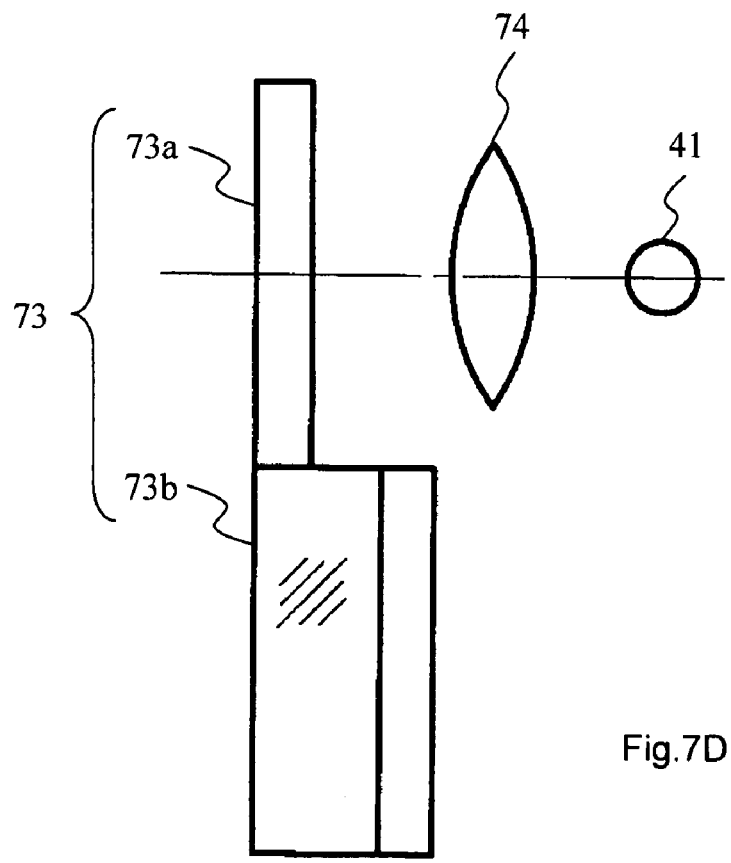
Figure 7E:
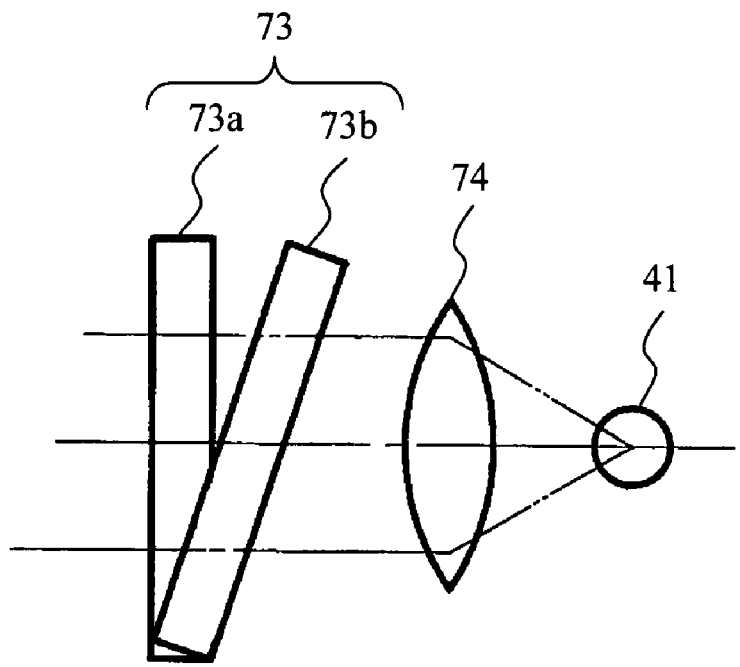

FIGS. 7A, 7B, and 7C show the state where the parallel flat plate part 73*b* is inserted in the light path and the parallel flat plate part 73*a* is removed from the light path, whereas FIGS. 7D and 7E show the state where the parallel flat plate part 73*a* is inserted in the light path and the parallel flat plate part 73*b* is removed from the light path. FIGS. 7B and 7D are top views, whereas FIGS. 7C and 7E are side views. Additionally, a condenser lens 74 is provided between the light source 41 and the parallel flat plate 73 in FIGS. 7A, 7B, 7C, and 7D. However, this lens is omitted in FIG. 7A.

According to such a configuration example, the light path can be shifted as shown in FIGS. 7E to 7C by changing the parallel flat plate part inserted in the light path from 73*a* to 73*b*, and consequently, the optical position of the light source 41 can be changed. Besides, the intensity distribution of the light flux incident to the SLM 44 can be also controlled by changing the optical position of the light source 41 in this way.

Figure 8A:
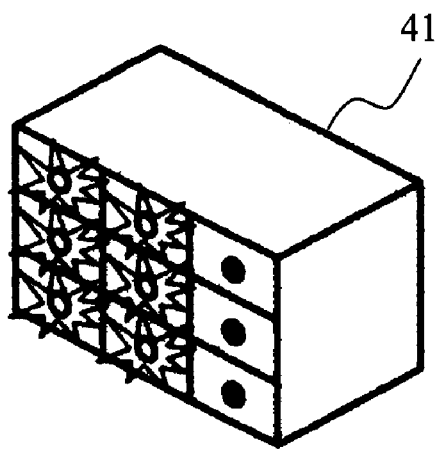
FIGS. 8A and 8B show a projecting device with control of the light intensity distribution of the incident light by an array of light emitting elements with each light emitting element controlled to turn on or off for controlling the light intensity distributions.
Figure 8B:
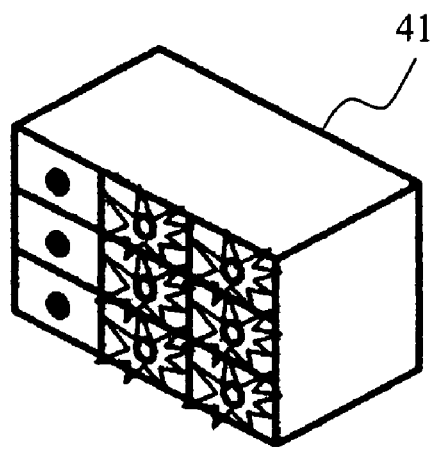

Referring to FIGS. 8A and 8B for an alternate example of a light source of this invention to control the light intensity distribution of the incident light. The light source includes an array of light emitting elements wherein each light emitting element is controlled to turn on or off for controlling the light intensity distributions.

FIGS. 8A and 8B show another configuration example for changing the optical position of the light source 41. In this configuration example, the light source 41 has a configuration where light emitting elements, which are a plurality of sub-light sources, are arranged in the form of an array, and the optical position of the light source 41 is changed by selecting a light emitting element made to emit light, and a light emitting element made not to emit light. The light emitting element is, for example, a laser light source, an LED (Light Emitting Diode) light source, etc.

The light source 41 shown in FIG. 8A represents a state where light emitting elements in two rows on the left side of a light emission plane emit light, and the remaining elements do not emit light. In the meantime, the light source 41 shown in FIG. 8B represents a state where light emitting elements in two rows on the right side of the light emission plane emit light, and the remaining elements do not emit light. Light emitting elements made to emit light, and light emitting elements made not to emit light are selected in this way, whereby the optical position of the light source 41 can be changed. Besides, the intensity distribution of light flux incident to the SLM 44 can be also controlled by changing the optical position of the light source 41 in this way.

Additionally, with the projection device according to this embodiment, the relationships between the mirror status and the light intensity, which are shown in FIGS. 2 and 3, can be also adjusted by making the intensity distribution of illumination light uniform within the range of an incident NA to each deflecting mirror of the SLM 44, and by giving the cross section of illumination light flux a shape other than the shape of the cross section of a solid circle centering on the optical axis of the illumination light. Namely, the relationships can be adjusted only by making the shape of a radiation field different. An example where the shape of the radiation field is made different is as described with reference to (B-1) to (B-4), and (D-1) to (D-4), which are shown in FIG. 2, and (F-1) to (F-4), which are shown in FIG. 3.

Furthermore, the projection device according to this embodiment can be also configured to make a plurality of illumination light fluxes exist.

Figure 9A:
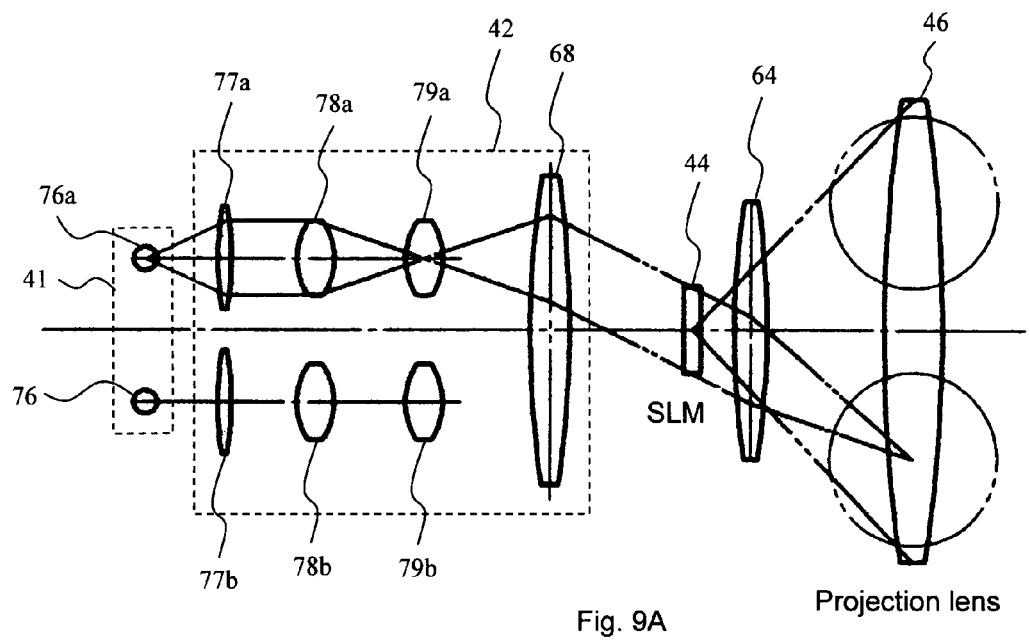
FIGS. 9A to 9C shows a projection device that employs one or several light sources to generate controllable light intensity distributions that can be non-uniform distributions at the iris of the projection optics.
Figure 9B:
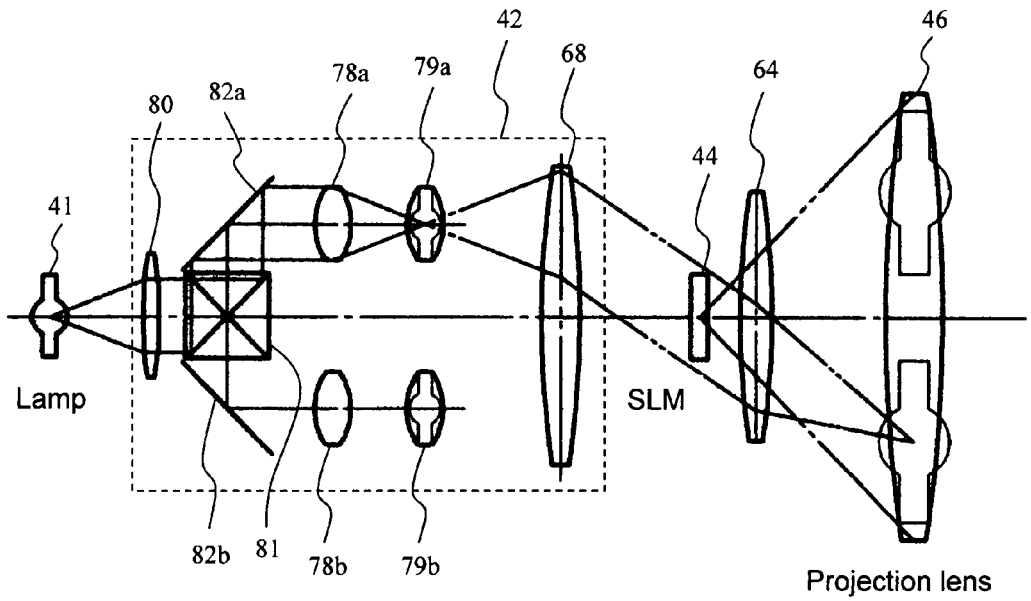
Figure 9C:
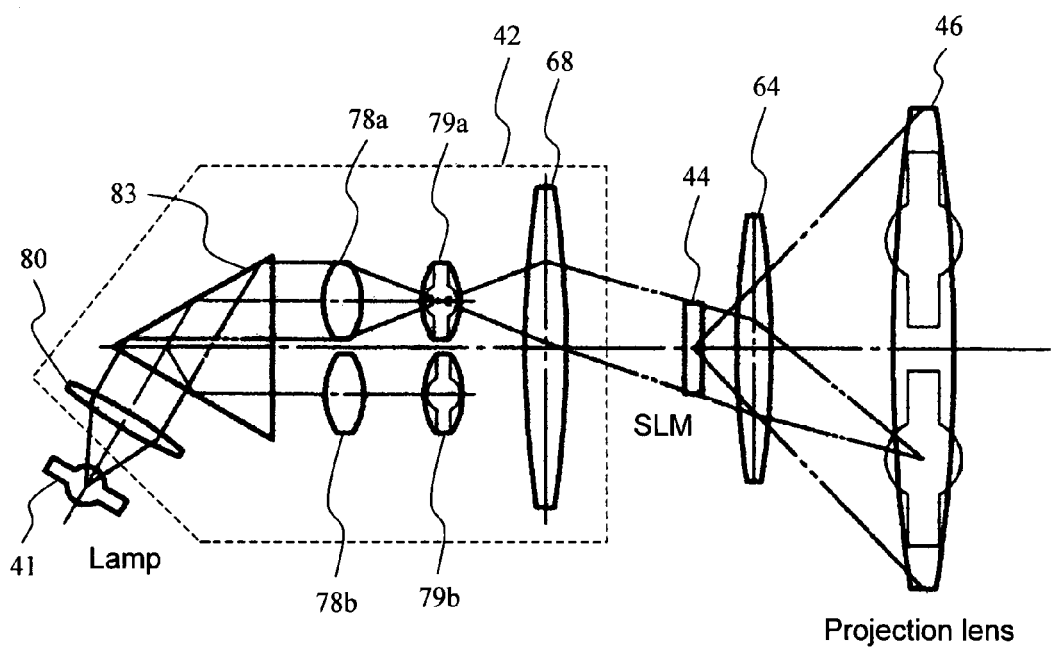

Referring to FIGS. 9A to 9C for the projection device that employs one or several light sources to generate controllable light intensity distributions that can be non-uniform distributions at the iris 46*a* of the projection optics 46.

FIGS. 9A to 9C show configuration examples for making a plurality of illumination light fluxes exist. FIGS. 9A to 9C depict that light passes through the SLM 44, for the sake of convenience. Actually, however, light reflects on the SLM 44 as shown in FIGS. 2 and 3. Besides, in FIGS. 9A to 9C, a condenser lens 64 is provided between the SLM 44 and the projection optics (projection lens) 46. In FIGS. 2 and 3, this lens is omitted.

In the configuration example shown in FIG. 9A, the light source 41 comprises two sub-light sources 76 (76a, 76b), and the illumination optics means 42 comprises two first condenser lenses 77 (77a, 77b), two second condenser lenses 78 (78a, 78b), two relay lenses 79 (79a, 79b), and an illumination lens 68. In this configuration example, two illumination light fluxes, such as an illumination light flux that passes through the first condenser lens 77a, the second condenser lens 78a, the relay lens 79a, and the illumination lens 68 from the sub-light source 76a and is incident to the SLM 44, and an illumination light flux that passes through the first condenser lens 77b, the second condenser lens 78b, the relay lens 79b, and the illumination lens 86 from the sub-light source 76b and is incident to the SLM 44, exist. As described above, in this configuration example, the two illumination light fluxes are obtained from the two sub-light sources.

In the configuration example shown in FIG. 9B, the illumination optics means 42 comprises a first condenser lens 80, a light path separation element 81, two mirrors 82 (82a, 82b), two second condenser lenses 78 (78a, 78b), two relay lenses 79 (79a, 79b), and an illumination lens 68. In this configuration example, light that is incident to the light path separation element 81 from the light source 41 after passing through the first condenser lens 80 is separated into two directions. Two illumination light fluxes, such as an illumination light flux in one direction, which passes through the second condenser lens 78a, the relay lens 79a, and the illumination lens 68 after reflecting on the mirror 82a and is incident to the SLM 44, and an illumination light flux in the other direction, which passes through the second condenser lens 78b, the relay lens 79b, and the illumination lens 68 after reflecting on the mirror 82b and is incident to the SLM 44, exist. In this way, two illumination light fluxes can be obtained by separating a light flux from a single light source into two in this configuration example.

In the configuration example shown in FIG. 9C, the illumination optics means 42 comprises a first condenser lens 80, a light path separation element 83, two second condenser lenses 78 (78a, 78b), two relay lenses 79 (79a, 79b), and an illumination lens 68. In this configuration example, light that passes through the first condenser lens 80 from the light source 41 and is incident to the light path separation element 81 is separated into two directions. Two illumination light fluxes, such as an illumination light flux in one direction, which passes through the second condenser lens 78a, the relay lens 79a, and the illumination lens 68 and is incident to the SLM 44, and an illumination light flux in the other direction, which passes through the second condenser lens 78b, the relay lens 79b, and the illumination lens 68 and is incident to the SLM 44, exist. In this way, two illumination light fluxes can be obtained by separating a light flux from a single light source into two also in this configuration example.

FIGS. 9A to 9C refer to the configuration examples where the two illumination light fluxes exist. In a similar manner, a configuration where three or more illumination light fluxes exist can be also implemented. Additionally, each of a plurality of existing illumination light fluxes can be also made to differ in one or more of a frequency, an intensity distribution, and the shape of the cross section of light flux.

The SLM 44 includes a plurality of deflecting mirrors controllable to oscillate between ON-OFF position with intermediate states to coordinate with the incident light intensity distributions for generating multiple controllable gray scales to optimize the visual effects of the image display.

Figure 10A:
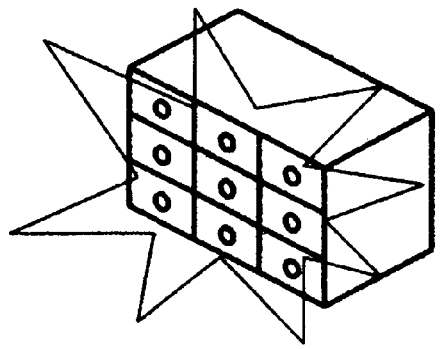
FIGS. 10A, 10B, and 10C explain a configuration example of a light source when a plurality of illumination light fluxes are obtained from a plurality of sub-light sources.
Figure 10B:
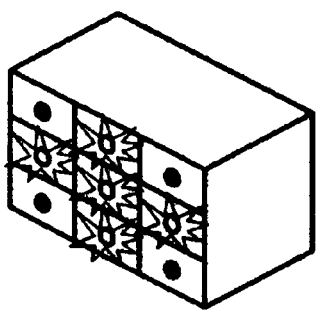
Figure 10C:
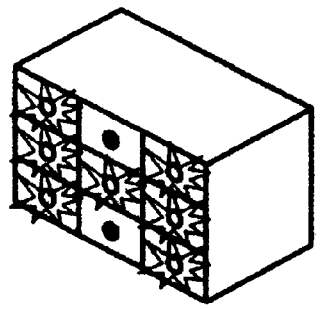

FIGS. 10A, 10B, and 10C explain a configuration example of the light source 41 when a plurality of illumination light fluxes are obtained from a plurality of sub-light sources. If a plurality of illumination light fluxes are obtained from a plurality of sub-light sources as shown in the above described FIG. 9A, the plurality of illumination light fluxes can be also obtained by applying, as the light source 41, a light source having a configuration where a plurality of sub-light sources are arranged in the form of an array, and by selecting sub-light sources made to emit light, and sub-light sources made not to emit light as shown in FIGS. 10A to 10C. The sub-light source is, for example, a laser light source, an LED light source, etc. Additionally, in this case, the intensity distribution of incident light flux can be also made non-uniform by changing the light emission amount of each of the sub-light sources.

In the light source unit composed of the plurality of sub-light sources shown in FIG. 10, the sub-light sources may be those emitting light of different frequencies, or those emitting light of the same frequency. In this case, if illumination lights emitted by adjacent sub-light sources are arranged to emit different primary colors, differences in the optical layout of each color can be reduced, and this is preferable. Additionally, the pattern of the light emission or the non-light emission of the sub-light sources is configured to be arbitrarily changeable. A light-up pattern can be determined so that sub-light sources emitting light are arranged, for example, symmetrically or asymmetrically with the optical axis. Besides, if a selection of such a light emission pattern is configured to be arbitrarily switchable during a display control period, more detailed gray scale reproduction can be made. For example, with a so-called color sequential display method for configuring a color image by sequentially displaying images of different colors within one frame, an individual gray scale reproduction characteristic can be obtained by changing the light emission pattern of a light source unit for each color. Besides, a light emission intensity may be changed in addition to a change made to the light emission pattern.

Here, it is important to reduce the light emission plane of the light source unit, which is composed of the plurality of sub-light sources, to the minimum of an area for the purpose of increasing the use efficiency of light. From this point of view, semiconductor laser, etc. is preferable as the light source unit. Besides, the light source unit may be a configuration where the output planes of optical transmission means such as an optical fiber, etc., which transmits illumination light from the light source, are arranged in the form of a matrix. At this time, the number of light sources and that of the output planes of the optical transmission means do not need to always match. The optical transmission means may further comprise optical synthesis or separation means. Preferably, the area of the light emission plane of the light source unit is configured to be equal to or smaller than 5 mm$^2$ in order to efficiently achieve the object of the present invention without unnecessarily increasing the area of the light source, and without decreasing the intensity of projection light to the light modulator.

Furthermore, if the plurality of lasers is used for light source, the optical length from each laser to the SLM can be different from each other or the timing of each laser pulse is staggered in order to reduce speckle noise.

As described above, the first embodiment of the present invention is the projection device using the deflecting type spatial light modulator for directing the illumination light from the light source toward the projection light path, and implemented to have an illumination configuration where the intensity distribution in the position of the optical pupil of the projection light path of illumination light becomes non-uniform, and/or an illumination configuration where the cross section of light flux in the position of the optical pupil of the projection light path of illumination light takes a shape other than the shape of the cross section of a solid circle centering on the optical axis, in order that a change in a light amount incident to the projection light path in the deflection process of the illumination light, which is performed by the deflecting type spatial light modulator, becomes preferable for intermediate gray scale reproduction.

With such a configuration, a finer intermediate gray scale light amount or a stable intermediate gray scale can be obtained by preferably adjusting the change curve of the amount of output light, which varies with a change in the angle of the deflecting mirror of the deflecting type spatial light modulator. Additionally, a predetermined light amount is made incident to the projection light path by using a change in the light amount incident to the projection light path in an optimized deflection process, whereby high gray scale projection can be implemented.

Second Embodiment

A projection device according to this embodiment comprises a light source, illumination optics means for collecting and directing light from the light source, a deflecting type spatial light modulator (hereinafter referred to simply as SLM), a projection light path for projecting the light modulated by the SLM, and control means for controlling the deflection angle holding operation and the oscillation operation of each deflecting mirror (mirror element) of the SLM based on an input signal so that a desired light amount is directed toward the optical pupil of the projection light path.

In the projection device according to this embodiment, the light source and/or the illumination optics means are configured so that the intensity distribution of illumination light in the position of the optical pupil of the projection light path becomes non-uniform. Additionally, the control means can control the deflecting mirror to hold a particular deflection angle in a first control period, and can control the deflecting mirror to oscillate in a second control period. Furthermore, this projection device can increase or decrease the intensity of light incident to the SLM in at least one of the first and the second control periods, or in one or more sub-control periods when at least one of the first and the second control periods is further divided into two or more sub-control periods.

Figure 11:
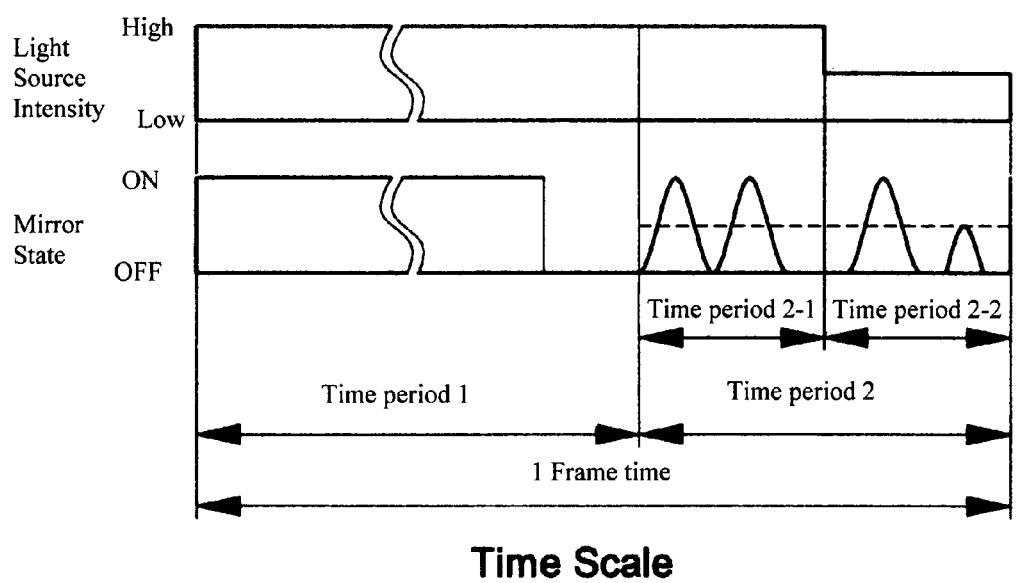
FIG. 11 shows another light source implemented with a controllable time modulated light collector.

FIG. 11 shows the second embodiment of this invention where the light source implemented with a light collector is employed. The light intensity projected from the light source is controlled by controlling the light collecting characteristics by applying a time modulation between different periods. These time periods are shown as time period 1 and period 2 with two sub-periods shown as time period 2-1 and time period 2-2. By time modulating the light collector, a light intensity distribution can be projected from the light source thus achieve the purpose of generating additional gray scales by controlling the incident light intensity distributions.

FIG. 11 shows an example of operations per frame time of the projection device according to this embodiment. In this figure, mirror status represents the status of one deflecting mirror in the SLM. Additionally, a time period 1 represents a first control period, a time period 2 represents a second control period, and time periods 2-1 and 2-2 represent two control periods when the second control period is divided into two sub-control periods.

In the example of the operations in this figure, light source intensity is controlled to be high in the time period 1. Additionally, the deflection angle of the deflecting mirror is controlled so that the mirror status becomes ON status in a predetermined time period within the time period 1, and the deflection angle of the deflecting mirror is controlled so that the mirror status becomes OFF status in the rest of the time period 1.

Additionally, in the time period 2, the light source intensity is controlled to be high in the time period 2-1, and controlled to be between high and low in the time period 2-2. Additionally, the deflecting mirror is oscillation-controlled so that the mirror status becomes an oscillation status in the time period 2. The deflecting mirror may be oscillation-controlled to reduce the oscillation amplitude of the deflecting mirror in the time period 2-1 or 2-2.

As described above, the deflecting mirror is oscillation-controlled in the time period 2 within 1 frame time, and not only the light source intensity but also the oscillation amplitude of the deflecting mirror is decreased in the time period 2-2, into which the time period 2 is arbitrarily divided, whereby finer intermediate gray scale representation can be made.

Here, control is easy if a time period during which the light source intensity is increased or decreased is set to an integral multiple of the natural period of the deflecting mirror. However, the intensity of the light source may be modulated, for example, in a time period required until output light stops its incidence to the pupil of the projection lens within a time period from when the output light actually starts its incidence to the pupil of the projection lens until when the mirror element makes a transition to the OFF status via the ON status after starting to oscillate from the OFF status. Namely, assuming that the natural period of the deflecting mirror is T, similar effect can be obtained also by modulating the intensity of the light source during a time period from when $\frac{1}{4}$ of T almost elapses until when $\frac{3}{4}$ of T almost elapses after the time period 2-2 starts, namely, after the mirror element starts to oscillate. Furthermore, a control may be performed to turn the illumination light off in a time period from when the mirror element starts to oscillate until when $\frac{1}{4}$ of T elapses, and in a time period from when $\frac{3}{4}$ of T elapses until when T elapses. The control for turning the illumination light off in synchronization with the oscillation period is also applicable to the time period 2-1. As described above, the light source is turned off in a time period during which the reflection light from the mirror element is not practically incident to the pupil of the projection lens, and the modulation of the intensity of the light source light is controlled in a time period during which the reflection light from the mirror element is incident to the pupil of the projection lens, in synchronization with the operational periods of the mirror element as described above, whereby unnecessary reflection light can be prevented from being incident to the pupil of the projection lens, and the contrast of a projection image can be prevented from being degraded.

In the meantime, a gray scale control becomes easy and is theoretically preferable if the degree of decrease of the light source light in the time period 2-2 is set to 1/n (n is an integer) of the intensity of the light source in the time period during which the light source light is not modulated, namely, the time period 1 and the time period 2-1. However, the degree of decrease of light source light may be arbitrarily set based on the light amount desired to be obtained with the oscillation control of the mirror element.

In the embodiment, the degree of modulation of the light source light is implemented as two stages. However, the degree of modulation may be implemented as a plurality of modulation intensities including the above described OFF status. With such a configuration, finer gray scale reproduction can be made.

Additionally, the time period 2 during which the mirror element is oscillation-controlled is divided to make the light source modulation in the embodiment. However, a time period during which ON/OFF of the mirror element is controlled may be divided to make the light source modulation. In this case, the time period during which the light source modulation is made is equalized to a minimum time unit in which the mirror is turned on, a time period during which the light source modulation is made is provided separately from the time period of the ON/OFF control, during which the light source light is not modulated, and the mirror element is turned on/off in the provided time period, so that gray scales can be increased. The degree of modulation of the light source light may be arbitrarily set depending on a required light intensity as described above.

For the above described modulation of the intensity of the light source light, it is preferable to use a light source that is superior in responsiveness, such as a laser light source, etc. The modulation of the intensity of the light source can be implemented also by changing the light emission pattern and the number of light emissions of the light source array shown in FIG. 10 in addition to the method for modulating the intensity or the light emission time of a single light source.

Additionally, with a so-called color sequential display method for configuring a color image by sequentially displaying images of different colors within one frame, 1 frame time shown in FIG. 11 is executed by being replaced with sub-frames of respective colors. That is, a time period during which only one of the three primary colors is displayed is divided into first and second control periods, and the modulation of the intensity of the light source is made. At this time, whether or not to modulate the intensity of the light source, or the degree of modulation of the intensity may be made different for each of the colors. For example, the intensity of the light source may be modulated only in a time period during which the green color having high human visual sensitivity is displayed. Besides, if one frame is configured with multiple repetitions of sub-sequences of the three primary colors within 1 frame time, whether or not to modulate the intensity of the light source, or the degree of modulation of the intensity may be arbitrarily set in each sub-sequence in order to reduce a problem called a color break.

Furthermore, if sub-light sources of two different primary colors are made to emit light simultaneously, the emitted lights can be used as complementary illumination light, with which the above described intensity modulation may be combined and controlled.

In the projection device according to this embodiment, the light source and/or the illumination optics means are configured to make the intensity distribution of illumination light in the position of the optical pupil of the projection light path non-uniform. However, the light source and/or the illumination optics means can be also configured, for example, to make the intensity distribution uniform. Also with such a configuration, intermediate gray scale representation finer than conventional techniques can be made.

Additionally, in the projection device according to this embodiment, as the means for increasing or decreasing the intensity of light incident to the SLM, a variety of methods can be considered in addition to the method for increasing/decreasing the intensity of the light source itself as described above.

Figure 12A:
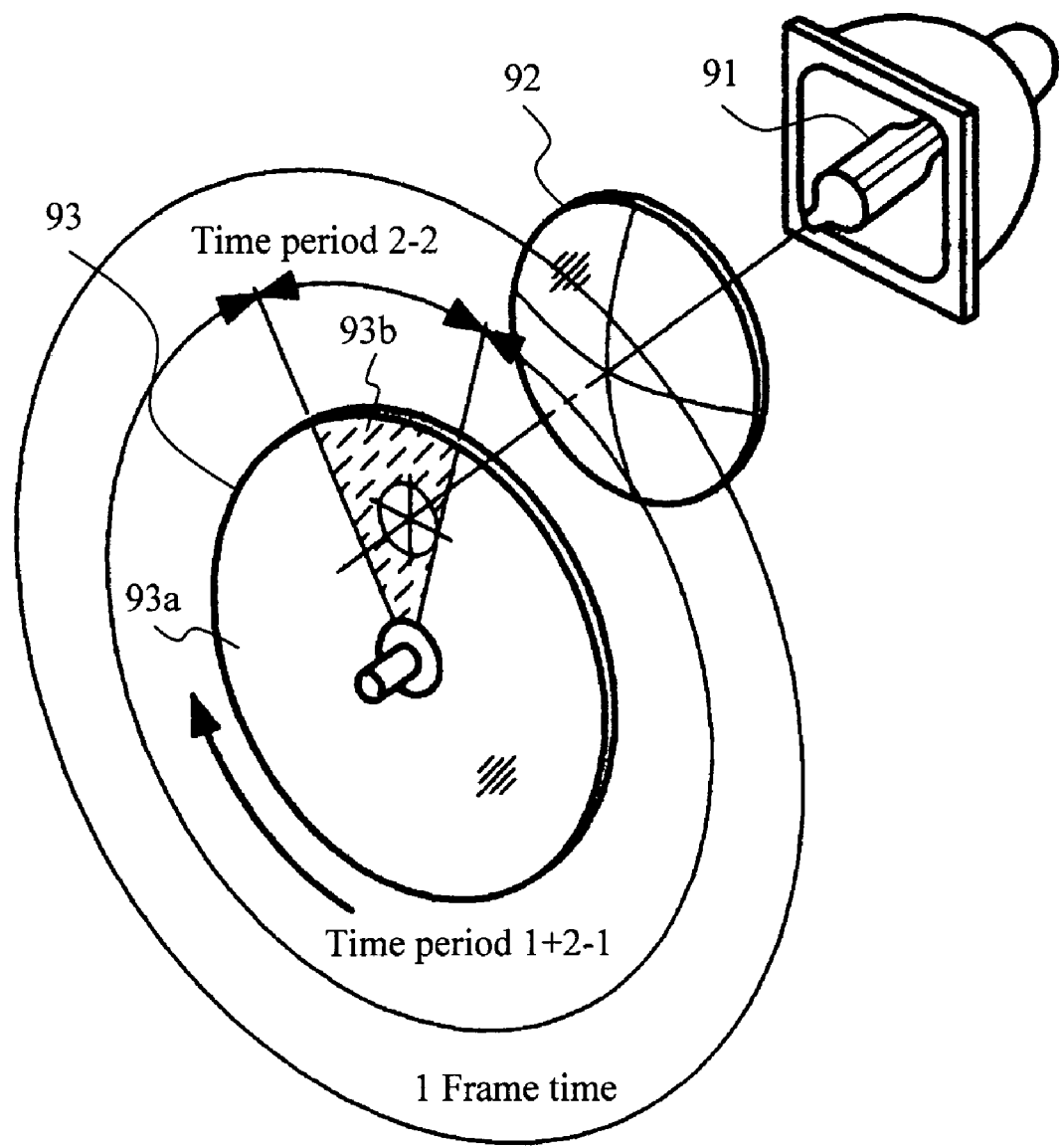
FIGS. 12A and 12B for a projection device that employs a rotational light attenuator to control the light intensity distribution.
Figure 12B:
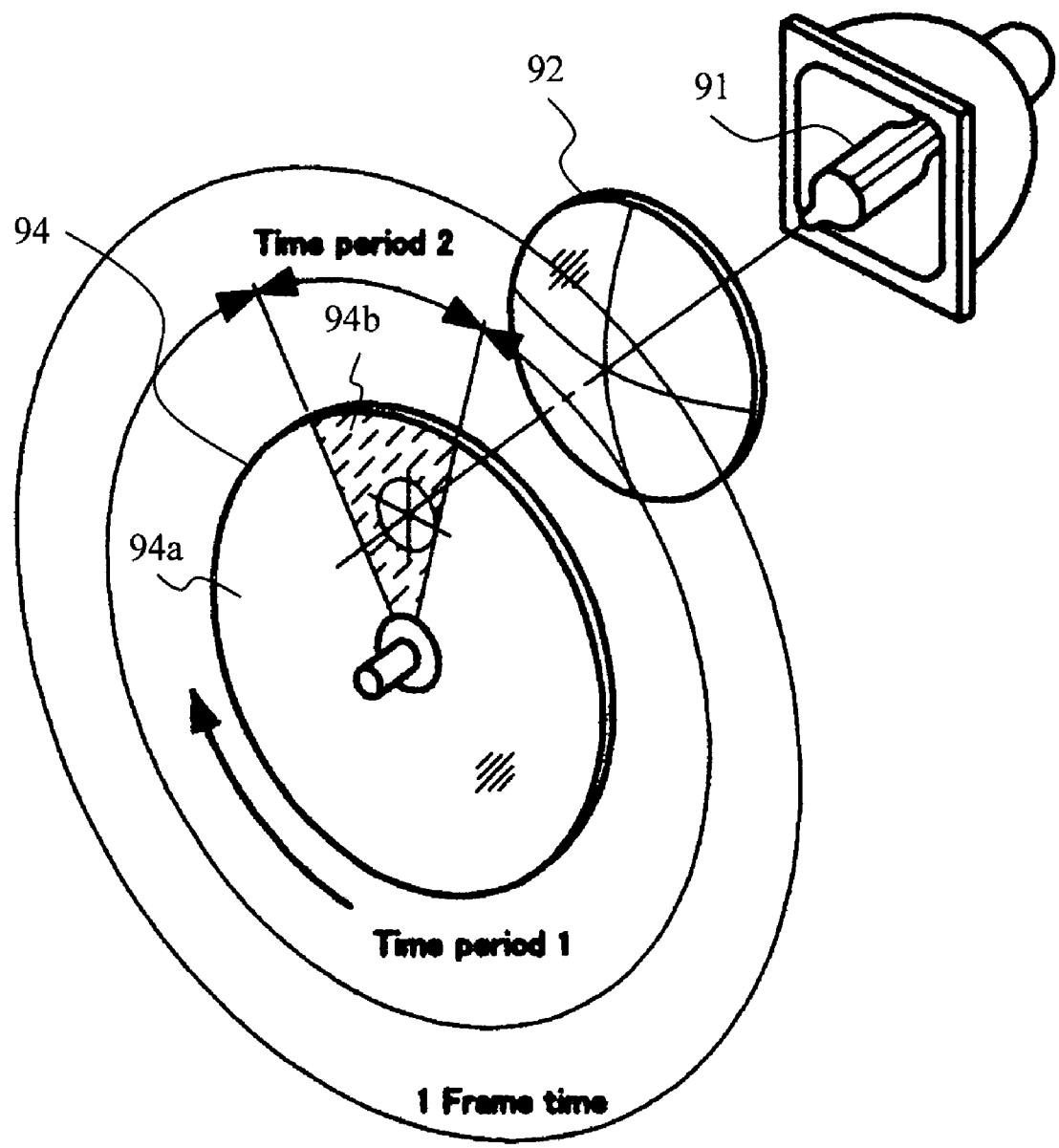

Referring to FIGS. 12A and 12B for the light projection device that employs a rotational light attenuator as a light intensity control mechanism. The rotational light intensity attenuator has different transmission indexes along different angular sections of a rotational wheel for flexibly control of the light intensity projected onto the SLM for image display.

In FIG. 12A, the means for increasing or decreasing the intensity of light incident to the SLM is the rotational light intensity attenuator 93 provided in the light path. The rotational light intensity attenuator 93 is configured so that it makes one rotation in 1 frame time, and a portion of high transmittance (for example, a portion of transmittance of 100 percent) 93a is inserted in the light path in the time periods 1 and 2-1 shown in FIG. 11, and a portion of low transmittance (for example, a light attenuation element portion of transmittance of 50 percent) is inserted in the light path in the time period 2-2. As a result, the portion of high transmittance 93a or the portion of low transmittance 93b is inserted/removed in/from the light path in synchronization with each control period, whereby the intensity of light incident to the SLM can be controlled in a similar manner as in the case shown in FIG. 11.

Additionally, if the intensity of light incident to the SLM is desired to be decreased not only in the time period 2-2 but also, for example, over the time period 2, the rotational light intensity attenuator can be also configured so that a portion of high transmittance 94a is inserted in the light path in the time period 1, and a portion of low transmittance 94b is inserted in the light path in the time period 2 as in the rotational light intensity attenuator 94 shown in FIG. 12B.

In FIGS. 12A and 12B, a condenser lens 92 is provided between the light source 91 and the rotational light intensity attenuator 93 or 94. Here, the condenser lens 92 and the rotational light intensity attenuator 93 or 94 are a portion of the illumination optics means.

Figure 13A:
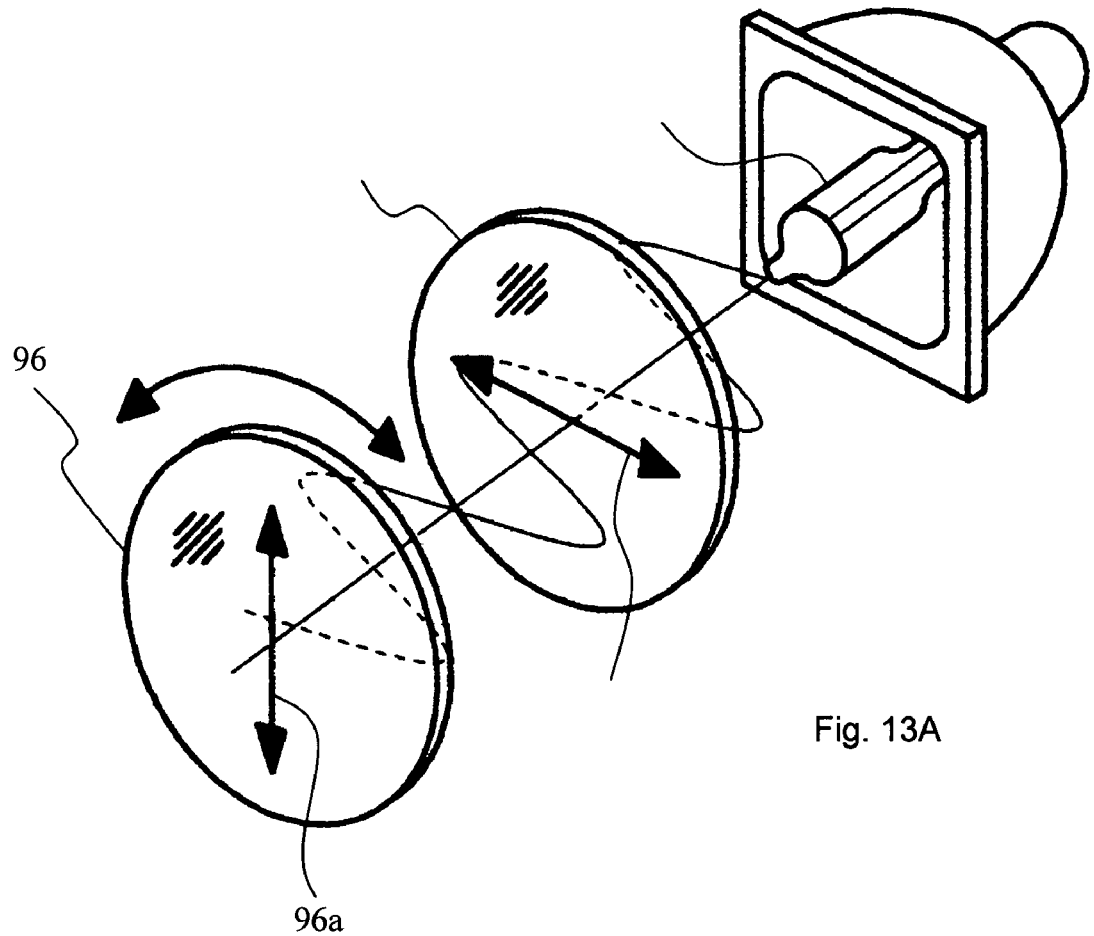
FIGS. 13A and 13B show a rotational polarizing lens with different polarization along vertical and horizontal axes to control the incident light intensity.
Figure 13B:
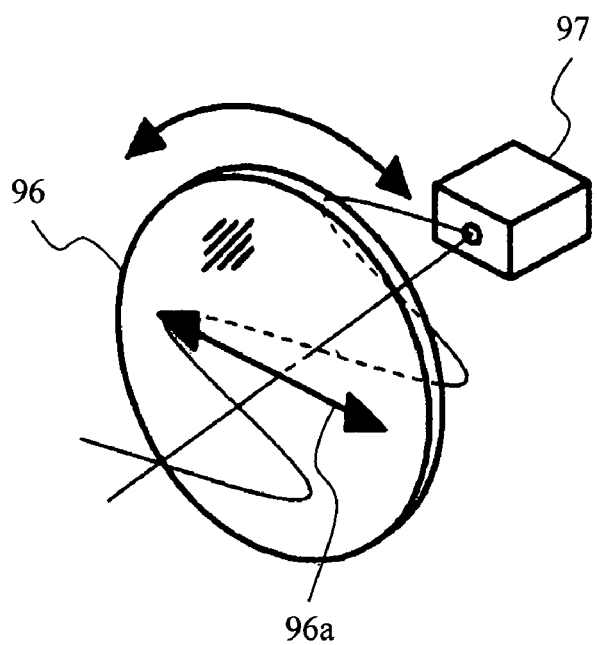

FIGS. 13A and 13B is another example where the illumination optics means includes a rotational polarizing lens with different polarization along vertical and horizontal axes of the lens such that by rotating the lens, variations of different light transmissions are achieved to control the incident light intensity.

In FIG. 13A, means for increasing or decreasing the intensity of light incident to the SLM is rotational polarizing lenses 95 and 96 provided in the light path. The rotational polarizing lens 95 is fixed, whereas the rotational polarizing lens 96 is configured to be rotatable. Additionally, arrows 95a and 96a indicate the polarization directions of light that passes through the rotational polarizing lenses. The light source 91 is a light source that emits incoherent light. With such a configuration, transmission light can be selected by rotating the rotational polarizing lens 96 in synchronization with each control period, and light of a desired intensity can be made incident to the SLM.

Additionally, if a light source that emits coherent light is used as the light source, the illumination optics means can be configured by providing only the rotational polarizing lens 96 in the light path as shown in FIG. 13B. In FIG. 13B, a light source 97 is a laser light source that emits light the polarization direction of which is the horizontal direction.

In FIGS. 13A and 13B, the rotational polarizing lenses 95 and 96, or the rotational polarizing lens 96 is a portion of the illumination optics means.

Furthermore, in the projection device according to this embodiment, as the means for increasing or decreasing the intensity of light incident to the SLM, the light source can be also implemented to have a configuration where a plurality of sub-light sources are arranged in the form of an array. The sub-light source is, for example, a laser light source, an LED light source, etc. In this case, the intensity of light emission of each of the sub-light sources is changed in synchronization with each control period, whereby light of a desired intensity can be made incident to the SLM.

As described above, the second embodiment according to the present invention is configured to obtain more micro-output light by providing the control period (the second control period during which the above described oscillation-control is performed) for making intermediate gray scale reproduction with the use of a change in the amount of light incident to the projection light path in the deflection process of illumination light, and by further modulating the amount of illumination light.

With such a configuration, a finer intermediate gray scale light amount, or a more stable intermediate gray scale can be obtained. Besides, a desired light amount can be made incident to the projection light path by using a change in the amount of light incident to the projection light path in the deflection process of optimized illumination light, whereby projection with high gray scales can be implemented.

Furthermore, the change curve of the amount of output light, which varies with a change in the angle of the deflecting mirror of the SLM, is preferably adjusted by making the intensity distribution in the position of the optical pupil of the projection light path of illumination light non-uniform, whereby a finer intermediate gray scale light amount or a stable intermediate gray scale can be obtained.

The projection device according to this embodiment can be also implemented to have an illumination configuration where the cross section of light flux in the position of the optical pupil of the projection light path of illumination light takes a shape other than the shape of the cross section of a solid circle centering on the optical axis, in a similar manner as in the first embodiment. Also with such a configuration, a finer intermediate gray scale light amount or a stable intermediate gray scale can be obtained by preferably adjusting the change curve of the amount of output light, which varies with a change in the angle of the deflecting mirror of the SLM. Additionally, if the projection device is configured as described above, it can be further configured to make the intensity distribution in the position of the optical pupil of the projection light path of illumination light uniform.

Up to this point, the first and the second embodiments have been described. In the embodiments, a light source that emits incoherent light, such as a high-pressure mercury lamp, a halogen lamp, a xenon lamp, an LED, etc., or a light source that emits coherent light, such as a laser light source, etc. is applicable as the light source.

Additionally, the projection device according to the first embodiment can be also combined with a portion of the projection device according to the second embodiment, or the projection device according to the second embodiment can be combined also with a portion of the projection device according to the first embodiment.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

As described above, according to the present invention, the change curve of the amount of output light, which varies with a change in the angle of the deflecting mirror, is preferably adjusted by making the intensity distribution in the position of the optical pupil of the projection light path of illumination light non-uniform, and/or by giving the cross section of light flux in the position of the optical pupil of the projection light path of illumination light a shape other than the shape of the cross section of a solid circle centering on the optical axis, whereby a finer intermediate gray scale light amount or a stable intermediate gray scale can be obtained, Furthermore, the amount of illumination light is further modulated by providing a control period (a control period during which the oscillation-control of a mirror is performed) during which intermediate gray scale reproduction is made with the use of a change in the amount of light incident to the projection light path in the deflection process of illumination light, whereby a finer intermediate gray scale light amount or a stable intermediate gray scale can be obtained.

What is claimed is:

1. A projection device receiving a light from a light source through an illumination optics for projecting to a deflecting type spatial light modulator having a plurality of micromirrors controlled to deflect to different deflection angles for projecting a predefined amount of light toward an optical pupil disposed on an image-display projection light path, wherein:

said light source or said illumination optics is configured to project an illumination light with a non-uniform intensity distribution within a range of an incident NA (numeric aperture) to the each mirror element, a controller controls the micromirrors in a first control period, and a second control period to increase and decrease an intensity of light incident to said deflecting type spatial light modulator (SLM) in at least one of the first and the second control periods, or in one or more sub-control periods wherein at least one of the first and the second control periods is divided into two or more sub-control periods.

2. The projection device according to claim 1, further comprising
a removable light attenuation element disposed on a light path between said light source and said deflecting type SLM for adjusting the intensity of light incident to said deflecting type spatial light modulator (SLM) in synchronization with each of the control periods.

3. A projection device receiving a light from a light source through an illumination optics for projecting to a spatial light modulator having a plurality of micromirrors controlled to deflect to different deflection angles for projecting a predefined amount of light toward an optical pupil disposed on a projection light path, wherein:

said light source or said illumination optics is configured to make an intensity distribution or an average light amount of illumination light non-uniform within a range of an incident NA to the each mirror element, a controller to control the micromirrors to hold a particular deflection angle in a first control period, and controls the micromirrors to oscillate in a second control period, an intensity of light incident to said deflecting type spatial light modulator is increased or decreased in at least one of the first and the second control periods, or in one or more sub-control periods when at least one of the first and the second control periods is divided into two or more sub-control periods; and a polarizing element for adjusting a light transmitting therethrough for increasing or decreasing the intensity of light incident to said deflecting type spatial light modulator in synchronization with each of the control periods.

4. The projection device according to claim 1, wherein said controller controls said first and second control periods in synchronization with a resonant frequency of the micromirrors for adjusting said light intensity incident to said deflecting type spatial light modulator (SLM).

5. The projection device according to claim 1, wherein said controller controls said first and second control periods in synchronization with a minimum time unit for turning on said micromirrors for adjusting said light intensity incident to said deflecting type spatial light modulator (SLM).

6. The projection device according to claim 1, wherein said controller turns off said illumination light when the mirror element deflects said illumination light away from said image display projection light path.

7. The projection device according to claim 1, wherein said light source is modulated to project said illumination light with an intensity of two or more stages.

8. The projection device according to claim 1, wherein said controller applies color sequential control process for sequentially displaying images of different colors within one frame time.

9. The projection device according to claim 1, wherein the controller controls an intensity of said illumination light projected from said light source to said deflecting type spatial light modulator according to a scale of 1/n where n is an integer.

10. The projection device according to claim 1, wherein an oscillation amplitude of the micromirrors is changed during the second control period.

11. The projection device according to claim 1, wherein said light source is a laser light source or an LED light source.

12. A projection device receiving a light from a light source through an illumination optics for projecting to a spatial light modulator having a plurality of micromirrors controlled to deflect to different deflection angles for projecting a predefined amount of light toward an optical pupil disposed on a projection light path, wherein:
    said light source or said illumination optics is configured to make an intensity distribution or an average light amount of illumination light non-uniform within a range of an incident NA to the each mirror element,
    a controller to control the micromirrors to hold a particular deflection angle in a first control period, and controls the micromirrors to oscillate in a second control period,
    an intensity of light incident to said deflecting type spatial light modulator is increased or decreased in at least one of the first and the second control periods, or in one or more sub-control periods when at least one of the first and the second control periods is divided into two or more sub-control periods; and:
    said light source comprising an array of plurality of sub-light sources wherein each of the plurality of sub-light sources is controlled in the second control period, or in one or more sub-control periods in the second control period to emit an adjustable light intensity.

13. The projection device according to claim 12, wherein the intensity of light is adjusted in synchronization with a resonant frequency of the micromirrors.

14. The projection device according to claim 12, wherein the intensity of light is adjusted is the first control period, and also modulated in synchronization with a minimum time unit for turning on the micromirrors.

15. The projection device according to claim 12, wherein illumination is turned off while a deflection direction of the mirror element is in a direction where illumination light is not deflected to said projection light path.

16. The projection device according to claim 12, wherein said light source light is modulated to project a light with an intensity of two or more stages.

17. The projection device according to claim 12, wherein said light source is a laser light source or an LED light source.

18. The projection device according to claim 12, wherein the plurality of sub-light sources comprising sub-light sources of a same color or different colors.

19. The projection device according to claim 12, wherein: said plurality of sub-light sources are controlled to project a light emission pattern.

20. The projection device according to claim 19, wherein said plurality of sub-light sources are controlled to project a light emission pattern symmetrically or asymmetrically with an optical axis.

21. The projection device according to claim 19, wherein said plurality of sub-light sources are controlled to project a light emission pattern during a display time period.

22. The projection device according to claim 19, wherein said controller configuring a color image display by applying a color sequential method for sequentially displaying images of different colors within one frame time and controlling said plurality of sub-light sources in different sub-field for each of said colors.

23. The projection device according to claim 12, wherein said light source further comprising a light source, and a light guiding member.

24. The projection device according to claim 23, wherein the light guiding member further comprises a light synthesizer, or a light separator.

25. The projection device according to claim 12, wherein said light source projecting a light having a cross sectional area equal to or smaller than 5 mm$^2$.

26. The projection device according to claim 12, wherein said light source emits lights of two different primary colors.

27. A projection device receiving a light from a light source through an illumination optics for projecting to a spatial light modulator having a plurality of micromirrors controlled to oscillated to different deflection angles for projecting a predefined amount of light toward an optical pupil disposed on an image-display projection light path, wherein:
    a controller to control the micromirrors to hold a particular deflection angle in a first control period, and controls the micromirrors to continuously oscillate within an oscillation angle around a central oscillation axis in a second control period to operate in an intermediate state for controlling and adjusting an intensity of light incident to said spatial light modulator for increasing or decreasing said light intensity according to said oscillation angle and said central axis of oscillation of said micromirrors in at least one of said first and second control periods or in one or more sub-control periods.

28. The projection device according to claim 27, wherein said controller controls said first and second control periods in synchronization with a resonant frequency of the micromirrors for adjusting said light intensity.

29. The projection device according to claim 27, wherein said controller controls said first and second control periods in synchronization with a minimum time unit for turning on said micromirrors for adjusting said light intensity.

30. The projection device according to claim 27, wherein said controller turns off said illumination light when the mirror element deflects said illumination light away from said image display projection light path.

31. The projection device according to claim 27, wherein said light source is modulated to project said illumination light with an intensity of two or more stages.

32. The projection device according to claim 27, wherein said controller applies a color sequential control process for sequentially displaying images of different colors within one frame time.

33. The projection device according to claim 27, wherein the controller controls said intensity of said illumination light incident from said light source to said deflecting type spatial light modulator for decreasing said illumination light to 1/n of the intensity wherein n is an integer or flexibly adjusting said intensity of said illumination light.

34. The projection device according to claim 27, wherein: the controller adjusts the intensity of said illumination light incident from said light source to said deflecting type spatial light modulator; and
said controller further controls and adjusts an oscillation amplitude of said micromirrors.

35. The projection device according to claim 27, wherein said light source further comprises a laser light source or an LED light source.

36. A projection device receiving a light from a light source through an illumination optics for projecting to a spatial light modulator having a plurality of micromirrors controlled to oscillated to different deflection angles for projecting a predefined amount of light toward an optical pupil disposed on a an image-display projection light path, wherein
a controller to control the micromirrors to hold a particular deflection angle in a first control period, and controls the micromirrors to continuously oscillate within an oscillation angle around a central oscillation axis in a second control period to operate in an intermediate state for controlling and adjusting an intensity of light incident to said spatial light modulator for increasing or decreasing said light intensity according to said oscillation angle and said central axis of oscillation of said micromirrors in at least one of said first and second control periods or in one or more sub-control periods; and
said light source comprises a plurality of sub-light sources, and the intensity of light is increased or decreased depending on a change in a light emission amount, a light emission pattern, or the number of light emitting elements.

37. The projection device according to claim 36, wherein a time period during which the intensity of light is changed is synchronous with a resonant frequency of the mirror element.

38. The projection device according to claim 36, wherein illumination is turned off while a deflection direction of the mirror element is a direction where illumination light is not deflected to said projection light path.

39. The projection device according to claim 36, wherein a time period during which the intensity of light is changed is the first control period, and the intensity is modulated in synchronization with a minimum time unit in which the mirror element is turned on.

40. The projection device according to claim 36, wherein light source light is modulated to an intensity of two or more stages.

41. The projection device according to claim 36, wherein said light source is a laser light source or an LED light source.

42. The projection device according to claim 36, wherein the plurality of sub-light sources are composed of sub-light sources of a same color or different colors.

43. The projection device according to claim 36, wherein a light emission pattern of the plurality of sub-light sources is switched.

44. The projection device according to claim 43, wherein a light emission pattern of the plurality of sub-light sources is switched symmetrically or asymmetrically with an optical axis.

45. The projection device according to claim 43, wherein a light emission pattern of the plurality of sub-light sources is switched during a display time period.

46. The projection device according to claim 43, wherein said controller configuring a color image display by applying a color sequential method for sequentially displaying images of different colors within one frame time and controlling said plurality of sub-light sources in different sub-field for each of said colors.

47. The projection device according to claim 36, wherein said light source is composed of a light source, and a light guiding member.

48. The projection device according to claim 47, wherein the light guiding member comprises light synthesis means, or light separation means.

49. The projection device according to claim 36, wherein a light emission area of said light source is equal to or smaller than 5 $mm^2$.

50. The projection device according to claim 36, wherein said light source emits lights of two different primary colors.

\* \* \* \* \*